(12) United States Patent
Wilkins

(10) Patent No.: US 10,546,262 B2
(45) Date of Patent: Jan. 28, 2020

(54) SUPPLY CHAIN MANAGEMENT SYSTEM

(71) Applicant: Overstock.com, Inc., Salt Lake City, UT (US)

(72) Inventor: Alec Wilkins, Salt Lake City, UT (US)

(73) Assignee: Overstock.com, Inc., Midvale, UT (US)

(*) Notice: Subject to any disclaimer, the term of this patent is extended or adjusted under 35 U.S.C. 154(b) by 706 days.

(21) Appl. No.: 14/050,104

(22) Filed: Oct. 9, 2013

(65) Prior Publication Data

US 2014/0143099 A1 May 22, 2014

Related U.S. Application Data

(60) Provisional application No. 61/716,263, filed on Oct. 19, 2012.

(51) Int. Cl.
*G06Q 10/08* (2012.01)

(52) U.S. Cl.
CPC .......... *G06Q 10/08* (2013.01); *G06Q 10/087* (2013.01)

(58) Field of Classification Search
CPC ............................ G06Q 10/08; G06Q 10/087
See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,808,987 A | 2/1989 | Takeda et al. |
| 4,823,265 A | 4/1989 | Nelson |
| 4,854,516 A | 8/1989 | Yamada |
| 4,903,201 A | 2/1990 | Wagner |
| RE33,316 E | 8/1990 | Katsuta et al. |
| 5,027,110 A | 6/1991 | Chang et al. |
| 5,053,956 A | 10/1991 | Donald et al. |
| 5,063,507 A | 11/1991 | Lindsey et al. |
| 5,077,665 A | 12/1991 | Silverman et al. |

(Continued)

FOREIGN PATENT DOCUMENTS

| | | |
|---|---|---|
| CA | 2253543 | 10/1997 |
| CA | 2347812 | 5/2000 |

(Continued)

OTHER PUBLICATIONS

Levy, Michael, and Dhruv Grewal. "Supply chain management in a networked economy." Journal of Retailing 76.4 (2000): 415-429.*

(Continued)

*Primary Examiner* — Asfand M Sheikh
(74) *Attorney, Agent, or Firm* — Clayton Howarth, P.C.

(57) ABSTRACT

A supply chain management system that provides a single integration point to partners, retailers and distribution centers is described. The partners, retailers, and distribution centers register with a supply chain management system. Through the system, partners select those retailers with whom they desire to do business. Partners may further allocate inventory among selected retailers. The supply chain management system recommends distribution centers for maintaining product inventory.

26 Claims, 9 Drawing Sheets

(56) References Cited

U.S. PATENT DOCUMENTS

| | | |
|---|---|---|
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,377,354 A | 12/1994 | Scannell et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,621,790 A | 4/1997 | Grossman et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,970,547 A | 5/1999 | Foladare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,974,396 A | 10/1999 | Anderson et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,905 B1 | 3/2002 | Gershman et al. |
| 6,356,908 B1 | 3/2002 | Brown et al. |
| 6,366,899 B1 | 4/2002 | Kernz |
| 6,370,527 B1 | 4/2002 | Singhai |
| 6,373,933 B1 | 4/2002 | Sarkki et al. |
| 6,374,260 B1 | 4/2002 | Hoffert et al. |
| 6,381,410 B1 | 4/2002 | Amidhozour et al. |
| 6,415,270 B1 | 7/2002 | Rackson et al. |
| 6,415,320 B1 | 7/2002 | Hess et al. |
| 6,434,556 B1 | 8/2002 | Levin et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 | 2/2003 | Colborn |
| 6,523,037 B1 | 2/2003 | Monahan et al. |
| 6,601,061 B1 | 7/2003 | Holt et al. |
| 6,604,107 B1 | 8/2003 | Wang |
| 6,625,764 B1 | 9/2003 | Dawson |
| 6,643,696 B2 | 11/2003 | Davis et al. |
| 6,661,431 B1 | 12/2003 | Stuart et al. |
| 6,665,838 B1 | 12/2003 | Brown et al. |
| 6,675,178 B1 * | 1/2004 | Chinchar ............ G06Q 10/06 707/655 |
| 6,694,436 B1 | 2/2004 | Audebert |
| 6,701,310 B1 | 3/2004 | Sugiura et al. |
| 6,718,536 B2 | 4/2004 | Dupaquis |
| 6,725,268 B1 | 4/2004 | Jackel et al. |
| 6,728,704 B2 | 4/2004 | Mao et al. |
| 6,732,161 B1 | 5/2004 | Hess et al. |
| 6,732,162 B1 | 5/2004 | Wood et al. |
| 6,801,909 B2 | 10/2004 | Delgado et al. |
| 6,856,963 B1 | 2/2005 | Hurwitz |
| 6,889,054 B2 | 5/2005 | Himmel et al. |

(56) References Cited

U.S. PATENT DOCUMENTS

| | | | |
|---|---|---|---|
| 6,907,401 B1* | 6/2005 | Vittal | G06Q 30/06 705/26.2 |
| 6,978,273 B1* | 12/2005 | Bonneau | G06Q 30/02 |
| 7,043,450 B2 | 5/2006 | Velez et al. | |
| 7,069,242 B1 | 6/2006 | Sheth et al. | |
| 7,076,453 B2 | 7/2006 | Jammes et al. | |
| 7,076,504 B1 | 7/2006 | Handel et al. | |
| 7,080,030 B2 | 7/2006 | Elgen et al. | |
| 7,100,111 B2 | 8/2006 | McElfresh et al. | |
| 7,100,195 B1 | 8/2006 | Underwood | |
| 7,117,207 B1 | 10/2006 | Kerschberg et al. | |
| 7,127,416 B1 | 10/2006 | Tenorio | |
| 7,165,091 B2 | 1/2007 | Lunenfeld | |
| 7,167,910 B2 | 1/2007 | Farnham et al. | |
| 7,216,115 B1 | 5/2007 | Walters et al. | |
| 7,240,016 B1 | 7/2007 | Sturgis | |
| 7,254,547 B1 | 8/2007 | Beck et al. | |
| 7,318,037 B2 | 1/2008 | Solari | |
| 7,324,966 B2 | 1/2008 | Scheer | |
| 7,340,249 B2 | 3/2008 | Moran et al. | |
| 7,349,668 B2 | 3/2008 | Ilan et al. | |
| 7,353,188 B2 | 4/2008 | Yim et al. | |
| 7,366,755 B1 | 4/2008 | Cuomo et al. | |
| 7,379,890 B2 | 5/2008 | Myr et al. | |
| 7,380,217 B2 | 5/2008 | Gvelesiani | |
| 7,401,025 B1 | 7/2008 | Lokitz | |
| 7,447,646 B1 | 11/2008 | Agarwal et al. | |
| 7,451,476 B1 | 11/2008 | Banks | |
| 7,454,464 B2 | 11/2008 | Puthenkulam et al. | |
| 7,457,730 B2 | 11/2008 | Degnan | |
| 7,493,521 B1 | 2/2009 | Li et al. | |
| 7,496,525 B1* | 2/2009 | Mitchell | G06Q 30/06 705/26.8 |
| 7,496,582 B2 | 2/2009 | Farnham et al. | |
| 7,516,094 B2 | 4/2009 | Perkowski | |
| 7,539,696 B1 | 5/2009 | Greener et al. | |
| 7,546,625 B1 | 6/2009 | Kamangar | |
| 7,552,067 B2 | 6/2009 | Nephew et al. | |
| 7,565,615 B2 | 7/2009 | Ebert | |
| 7,606,743 B2 | 10/2009 | Orzell et al. | |
| 7,610,212 B2 | 10/2009 | Klett et al. | |
| 7,653,573 B2 | 1/2010 | Hayes, Jr. et al. | |
| 7,834,883 B2 | 11/2010 | Adams | |
| 7,904,348 B2* | 3/2011 | Johnson | G06Q 30/02 705/26.2 |
| 7,912,748 B1 | 3/2011 | Rosenberg et al. | |
| 7,921,031 B2 | 4/2011 | Crysel | |
| 7,941,751 B2 | 5/2011 | Ebert | |
| 7,983,950 B2 | 7/2011 | DeVita | |
| 8,086,643 B1 | 12/2011 | Tenorio | |
| 8,112,303 B2 | 2/2012 | Eglen et al. | |
| 8,140,989 B2 | 3/2012 | Cohen et al. | |
| 8,204,799 B1* | 6/2012 | Murray | G06Q 10/0835 705/26.81 |
| 8,214,264 B2 | 7/2012 | Kasavin et al. | |
| 8,260,852 B1 | 9/2012 | Cselle | |
| 8,312,056 B1 | 11/2012 | Peng et al. | |
| 8,370,435 B1 | 2/2013 | Bonefas | |
| 8,473,316 B1* | 6/2013 | Panzitta | G06Q 30/0234 705/26.81 |
| 8,494,912 B2 | 7/2013 | Fraser et al. | |
| 8,545,265 B2 | 10/2013 | Sakamoto et al. | |
| 8,577,740 B1 | 11/2013 | Murray et al. | |
| 8,630,960 B2 | 1/2014 | Gross | |
| 8,693,494 B2 | 4/2014 | Fiatal | |
| 9,047,341 B2 | 6/2015 | Pan | |
| 9,448,692 B1 | 9/2016 | Mierau | |
| 2001/0014868 A1 | 8/2001 | Herz et al. | |
| 2001/0034667 A1 | 10/2001 | Petersen | |
| 2001/0034668 A1 | 10/2001 | Whitworth | |
| 2001/0044751 A1 | 11/2001 | Pugliese et al. | |
| 2001/0047290 A1 | 11/2001 | Petras et al. | |
| 2001/0047308 A1 | 11/2001 | Kaminsky et al. | |
| 2001/0051996 A1 | 12/2001 | Cooper et al. | |
| 2002/0002513 A1 | 1/2002 | Chiasson | |
| 2002/0007356 A1 | 1/2002 | Rice et al. | |
| 2002/0013721 A1 | 1/2002 | Capel et al. | |
| 2002/0019763 A1 | 2/2002 | Linden | |
| 2002/0022995 A1 | 2/2002 | Miller et al. | |
| 2002/0023059 A1 | 2/2002 | Bari et al. | |
| 2002/0026390 A1 | 2/2002 | Ulenas et al. | |
| 2002/0029187 A1 | 3/2002 | Meehan et al. | |
| 2002/0038312 A1 | 3/2002 | Donner et al. | |
| 2002/0040352 A1 | 4/2002 | McCormick | |
| 2002/0042738 A1 | 4/2002 | Srinivasan et al. | |
| 2002/0049622 A1* | 4/2002 | Lettich | G06Q 10/063 705/7.11 |
| 2002/0056044 A1 | 5/2002 | Andersson | |
| 2002/0099578 A1 | 7/2002 | Eicher et al. | |
| 2002/0099579 A1 | 7/2002 | Scelzo et al. | |
| 2002/0099602 A1 | 7/2002 | Moskowitz et al. | |
| 2002/0107718 A1 | 8/2002 | Morrill et al. | |
| 2002/0107853 A1 | 8/2002 | Hofmann et al. | |
| 2002/0111826 A1 | 8/2002 | Potter | |
| 2002/0120537 A1 | 8/2002 | Morea et al. | |
| 2002/0123957 A1* | 9/2002 | Notarius | G06Q 30/06 705/37 |
| 2002/0124100 A1 | 9/2002 | Adams | |
| 2002/0129282 A1 | 9/2002 | Hopkins | |
| 2002/0133502 A1 | 9/2002 | Rosenthal | |
| 2002/0138399 A1* | 9/2002 | Hayes | G06Q 40/04 705/37 |
| 2002/0147625 A1 | 10/2002 | Kolke | |
| 2002/0161648 A1 | 10/2002 | Mason et al. | |
| 2002/0188777 A1 | 12/2002 | Kraft et al. | |
| 2002/0194049 A1 | 12/2002 | Boyd | |
| 2002/0198784 A1 | 12/2002 | Shaak et al. | |
| 2002/0198882 A1 | 12/2002 | Linden et al. | |
| 2003/0004855 A1 | 1/2003 | Dutta et al. | |
| 2003/0005046 A1 | 1/2003 | Kavanagh et al. | |
| 2003/0009362 A1 | 1/2003 | Cifani et al. | |
| 2003/0009392 A1 | 1/2003 | Perkowski | |
| 2003/0014400 A1 | 1/2003 | Siegel | |
| 2003/0028605 A1 | 2/2003 | Millett et al. | |
| 2003/0032409 A1 | 2/2003 | Hutcheson et al. | |
| 2003/0035138 A1 | 2/2003 | Schilling | |
| 2003/0036914 A1 | 2/2003 | Fitzpatrick et al. | |
| 2003/0040970 A1 | 2/2003 | Miller | |
| 2003/0041008 A1 | 2/2003 | Grey et al. | |
| 2003/0046149 A1 | 3/2003 | Wong | |
| 2003/0069740 A1 | 4/2003 | Zeidman | |
| 2003/0069790 A1 | 4/2003 | Kane | |
| 2003/0069825 A1 | 4/2003 | Burk et al. | |
| 2003/0088467 A1 | 5/2003 | Culver | |
| 2003/0088511 A1 | 5/2003 | Karboulonis et al. | |
| 2003/0093331 A1 | 5/2003 | Childs et al. | |
| 2003/0105682 A1 | 6/2003 | Dicker et al. | |
| 2003/0110100 A1 | 6/2003 | Wirth, Jr. | |
| 2003/0119492 A1 | 6/2003 | Timmins et al. | |
| 2003/0083961 A1 | 7/2003 | Bezos et al. | |
| 2003/0131095 A1 | 7/2003 | Kumhyr et al. | |
| 2003/0139969 A1 | 7/2003 | Scroggie et al. | |
| 2003/0140007 A1 | 7/2003 | Kramer | |
| 2003/0140121 A1 | 7/2003 | Adams | |
| 2003/0158792 A1 | 8/2003 | Perkowski | |
| 2003/0163340 A1 | 8/2003 | Fitzpatrick et al. | |
| 2003/0167213 A1 | 9/2003 | Jammes et al. | |
| 2003/0167222 A1 | 9/2003 | Mehrotra et al. | |
| 2003/0177103 A1 | 9/2003 | Ivanov et al. | |
| 2003/0187745 A1 | 10/2003 | Hobday et al. | |
| 2003/0200156 A1 | 10/2003 | Roseman et al. | |
| 2003/0204449 A1 | 10/2003 | Kotas et al. | |
| 2003/0217002 A1 | 11/2003 | Enborg | |
| 2004/0006509 A1 | 1/2004 | Mannik et al. | |
| 2004/0015416 A1 | 1/2004 | Foster et al. | |
| 2004/0029567 A1 | 2/2004 | Timmins et al. | |
| 2004/0044563 A1 | 3/2004 | Stein | |
| 2004/0055017 A1 | 3/2004 | Delpuch et al. | |
| 2004/0058710 A1 | 3/2004 | Timmins et al. | |
| 2004/0073476 A1 | 4/2004 | Donahue et al. | |
| 2004/0078388 A1 | 4/2004 | Melman | |
| 2004/0107136 A1 | 6/2004 | Nemirofsky et al. | |
| 2004/0117242 A1 | 6/2004 | Conrad et al. | |

(56) References Cited

U.S. PATENT DOCUMENTS

| | | |
|---|---|---|
| 2004/0122083 A1 | 6/2004 | Lippert et al. |
| 2004/0122681 A1 | 6/2004 | Ruvolo et al. |
| 2004/0122735 A1 | 6/2004 | Meshkin |
| 2004/0122855 A1 | 6/2004 | Ruvolo et al. |
| 2004/0128183 A1 | 7/2004 | Challey et al. |
| 2004/0128283 A1 | 7/2004 | Wang |
| 2004/0128320 A1 | 7/2004 | Grove et al. |
| 2004/0143731 A1 | 7/2004 | Audebert |
| 2004/0148232 A1* | 7/2004 | Fushimi .............. G06Q 30/06 705/26.62 |
| 2004/0172323 A1 | 9/2004 | Stamm |
| 2004/0172379 A1 | 9/2004 | Mott et al. |
| 2004/0174979 A1 | 9/2004 | Hutton et al. |
| 2004/0186766 A1 | 9/2004 | Fellenstein et al. |
| 2004/0199496 A1 | 10/2004 | Liu et al. |
| 2004/0199905 A1 | 10/2004 | Fagin et al. |
| 2004/0204989 A1 | 10/2004 | Dicker |
| 2004/0204991 A1 | 10/2004 | Monahan et al. |
| 2004/0230989 A1 | 11/2004 | Macey |
| 2004/0240642 A1 | 12/2004 | Crandell et al. |
| 2004/0249727 A1 | 12/2004 | Cook, Jr. et al. |
| 2004/0267717 A1 | 12/2004 | Slackman |
| 2005/0010925 A1 | 1/2005 | Khawand et al. |
| 2005/0021666 A1 | 1/2005 | Dinnage et al. |
| 2005/0038733 A1 | 2/2005 | Foster et al. |
| 2005/0044254 A1 | 2/2005 | Smith |
| 2005/0055306 A1 | 3/2005 | Miller et al. |
| 2005/0060664 A1 | 3/2005 | Rogers |
| 2005/0097204 A1 | 5/2005 | Horowitz et al. |
| 2005/0114229 A1 | 5/2005 | Ackley et al. |
| 2005/0120311 A1 | 6/2005 | Thrall |
| 2005/0131837 A1 | 6/2005 | Sanctis et al. |
| 2005/0144064 A1 | 6/2005 | Calabria et al. |
| 2005/0193333 A1 | 9/2005 | Ebert |
| 2005/0197846 A1 | 9/2005 | Pezaris et al. |
| 2005/0197950 A1 | 9/2005 | Moya et al. |
| 2005/0198031 A1 | 9/2005 | Pezaris et al. |
| 2005/0202390 A1 | 9/2005 | Allen et al. |
| 2005/0203888 A1 | 9/2005 | Woolsey et al. |
| 2005/0216300 A1 | 9/2005 | Appelman et al. |
| 2005/0262067 A1 | 11/2005 | Lee et al. |
| 2005/0273378 A1 | 12/2005 | MacDonald-Korth et al. |
| 2006/0009994 A1 | 1/2006 | Hogg et al. |
| 2006/0010105 A1 | 1/2006 | Sarukkai et al. |
| 2006/0015498 A1 | 1/2006 | Sarmiento |
| 2006/0031240 A1 | 2/2006 | Eyal et al. |
| 2006/0041638 A1 | 2/2006 | Whittaker et al. |
| 2006/0058048 A1 | 3/2006 | Kapoor et al. |
| 2006/0069623 A1 | 3/2006 | MacDonald Korth et al. |
| 2006/0085251 A1 | 4/2006 | Greene |
| 2006/0173817 A1 | 8/2006 | Chowdhury et al. |
| 2006/0206479 A1 | 9/2006 | Mason |
| 2006/0235752 A1 | 10/2006 | Kavanagh et al. |
| 2006/0259360 A1 | 11/2006 | Flinn et al. |
| 2006/0271671 A1 | 11/2006 | Hansen |
| 2006/0282304 A1 | 11/2006 | Hansen |
| 2007/0005424 A1 | 1/2007 | Arauz |
| 2007/0027760 A1 | 2/2007 | Collins et al. |
| 2007/0027814 A1 | 2/2007 | Tuoriniemi |
| 2007/0073641 A1 | 3/2007 | Perry et al. |
| 2007/0077025 A1 | 4/2007 | Mino |
| 2007/0078726 A1 | 4/2007 | MacDonald Korth et al. |
| 2007/0078849 A1 | 4/2007 | Slothouber |
| 2007/0083437 A1 | 4/2007 | Hamor |
| 2007/0094597 A1 | 4/2007 | Rostom |
| 2007/0100803 A1 | 5/2007 | Cava |
| 2007/0160345 A1 | 7/2007 | Sakai et al. |
| 2007/0162379 A1 | 7/2007 | Skinner |
| 2007/0174108 A1 | 7/2007 | Monster |
| 2007/0192168 A1 | 8/2007 | Van Luchene |
| 2007/0192181 A1 | 8/2007 | Asdourian |
| 2007/0206606 A1 | 9/2007 | Coleman et al. |
| 2007/0214048 A1 | 9/2007 | Chan et al. |
| 2007/0226679 A1 | 9/2007 | Jayamohan et al. |
| 2007/0233565 A1 | 10/2007 | Herzog et al. |
| 2007/0239534 A1 | 10/2007 | Liu et al. |
| 2007/0245013 A1 | 10/2007 | Saraswathy et al. |
| 2007/0260520 A1 | 11/2007 | Jha et al. |
| 2007/0282666 A1 | 12/2007 | Afeyan et al. |
| 2007/0288298 A1 | 12/2007 | Gutierrez |
| 2007/0299743 A1 | 12/2007 | Staib et al. |
| 2008/0015938 A1* | 1/2008 | Haddad ............... G06Q 20/387 705/14.38 |
| 2008/0021763 A1 | 1/2008 | Merchant |
| 2008/0052152 A1 | 2/2008 | Yufik |
| 2008/0071640 A1* | 3/2008 | Nguyen ............... G06Q 20/387 705/14.27 |
| 2008/0082394 A1 | 4/2008 | Floyd et al. |
| 2008/0103893 A1 | 5/2008 | Nagarajan et al. |
| 2008/0120342 A1 | 5/2008 | Reed |
| 2008/0126205 A1 | 5/2008 | Evans et al. |
| 2008/0126476 A1 | 5/2008 | Nicholas et al. |
| 2008/0133305 A1 | 6/2008 | Yates et al. |
| 2008/0140765 A1 | 6/2008 | Kelaita et al. |
| 2008/0162574 A1 | 7/2008 | Gilbert |
| 2008/0201218 A1 | 8/2008 | Broder et al. |
| 2008/0215456 A1 | 9/2008 | West et al. |
| 2008/0288338 A1 | 11/2008 | Wiseman et al. |
| 2008/0294536 A1 | 11/2008 | Taylor et al. |
| 2008/0300909 A1 | 12/2008 | Rikhtverchik et al. |
| 2008/0301009 A1 | 12/2008 | Plaster et al. |
| 2008/0305869 A1 | 12/2008 | Konforty |
| 2008/0313010 A1 | 12/2008 | Jepson |
| 2009/0006190 A1 | 1/2009 | Lucash et al. |
| 2009/0030755 A1 | 1/2009 | Altberg et al. |
| 2009/0030775 A1 | 1/2009 | Vieri |
| 2009/0106080 A1 | 4/2009 | Carrier et al. |
| 2009/0106127 A1 | 4/2009 | Purdy et al. |
| 2009/0110181 A1 | 4/2009 | Koenig |
| 2009/0119167 A1 | 5/2009 | Kendall et al. |
| 2009/0157537 A1 | 6/2009 | Miller |
| 2009/0164323 A1 | 6/2009 | Byrne |
| 2009/0182589 A1 | 7/2009 | Kendall et al. |
| 2009/0204848 A1 | 8/2009 | Kube et al. |
| 2009/0222348 A1 | 9/2009 | Ransom et al. |
| 2009/0222737 A1 | 9/2009 | Liesche |
| 2009/0234722 A1 | 9/2009 | Evevsky |
| 2009/0240582 A1 | 9/2009 | Sheldon-Neal et al. |
| 2009/0276284 A1 | 11/2009 | Yost |
| 2009/0276305 A1 | 11/2009 | Clopp |
| 2009/0292677 A1 | 11/2009 | Kim |
| 2009/0293019 A1 | 11/2009 | Raffel et al. |
| 2009/0313173 A1 | 12/2009 | Singh |
| 2010/0042684 A1 | 2/2010 | Broms et al. |
| 2010/0070448 A1 | 3/2010 | Omoigui |
| 2010/0076816 A1 | 3/2010 | Phillips |
| 2010/0076851 A1 | 3/2010 | Jewell, Jr. |
| 2010/0146413 A1 | 3/2010 | Phillips |
| 2010/0094673 A1 | 4/2010 | Lobo et al. |
| 2010/0107123 A1 | 4/2010 | Sareen |
| 2010/0145831 A1* | 6/2010 | Esfandiari ............ G06Q 10/087 705/28 |
| 2010/0228617 A1 | 9/2010 | Ransom et al. |
| 2011/0055054 A1 | 3/2011 | Glasson |
| 2011/0060621 A1 | 3/2011 | Weller et al. |
| 2011/0103699 A1 | 5/2011 | Ke et al. |
| 2011/0153383 A1 | 6/2011 | Bhattacharjya et al. |
| 2011/0153663 A1 | 6/2011 | Koren et al. |
| 2011/0173076 A1 | 7/2011 | Eggleston |
| 2011/0196802 A1 | 8/2011 | Ellis et al. |
| 2011/0225050 A1 | 9/2011 | Varghese |
| 2011/0231226 A1 | 9/2011 | Golden |
| 2011/0231383 A1 | 9/2011 | Smyth et al. |
| 2011/0271204 A1 | 11/2011 | Jones et al. |
| 2011/0276513 A1 | 11/2011 | Erhart et al. |
| 2012/0005187 A1 | 1/2012 | Chavanne |
| 2012/0030067 A1 | 2/2012 | Pothukuchi et al. |
| 2012/0084135 A1 | 4/2012 | Nissan et al. |
| 2012/0158715 A1 | 6/2012 | Maghoul et al. |
| 2012/0164619 A1 | 6/2012 | Meer |
| 2012/0166299 A1 | 6/2012 | Heinstein et al. |
| 2012/0231424 A1 | 9/2012 | Calman et al. |
| 2013/0073392 A1 | 3/2013 | Allen et al. |
| 2013/0080200 A1 | 3/2013 | Connolly et al. |

(56) References Cited

U.S. PATENT DOCUMENTS

| | | | |
|---|---|---|---|
| 2013/0080426 A1 | 3/2013 | Chen et al. | |
| 2013/0085893 A1 | 4/2013 | Bhardwaj et al. | |
| 2013/0144870 A1 | 6/2013 | Gupta et al. | |
| 2013/0145254 A1 | 6/2013 | Masuko et al. | |
| 2013/0151331 A1 | 6/2013 | Avner et al. | |
| 2013/0151388 A1 | 6/2013 | Falkenborg | |
| 2013/0191409 A1 | 7/2013 | Zeng | |
| 2013/0254059 A1 | 9/2013 | Teo | |
| 2013/0268561 A1 | 10/2013 | Christie et al. | |
| 2014/0019313 A1 | 1/2014 | Hu et al. | |
| 2014/0025509 A1 | 1/2014 | Reisz et al. | |
| 2014/0032544 A1 | 1/2014 | Mathieu et al. | |
| 2014/0114680 A1 | 4/2014 | Mills et al. | |
| 2014/0136290 A1* | 5/2014 | Schiestl | G06Q 10/0637 705/7.36 |
| 2014/0172652 A1 | 6/2014 | Pobbathi et al. | |
| 2014/0180758 A1 | 6/2014 | Agarwal | |
| 2014/0289005 A1 | 9/2014 | Laing et al. | |
| 2014/0337090 A1 | 11/2014 | Tavares | |

FOREIGN PATENT DOCUMENTS

| | | | |
|---|---|---|---|
| EP | 0636993 | 4/1999 | |
| EP | 0807891 | 5/2000 | |
| EP | 1241603 | 3/2001 | |
| GB | 2397400 | 7/2004 | |
| GB | 2424098 | 9/2006 | |
| JP | 2001283083 | 10/2001 | |
| JP | 2002318935 | 10/2002 | |
| JP | 2009505238 | 2/2009 | |
| WO | 97/17663 | 5/1997 | |
| WO | 98/32289 | 7/1998 | |
| WO | 98/47082 | 10/1998 | |
| WO | 9849641 | 11/1998 | |
| WO | 99/59283 | 11/1999 | |
| WO | 00/25218 | 5/2000 | |
| WO | 200109803 | 2/2001 | |
| WO | 200182135 | 11/2001 | |
| WO | 200197099 | 12/2001 | |
| WO | 200237234 | 11/2002 | |
| WO | 2003094080 | 11/2003 | |
| WO | 2007021920 | 2/2007 | |
| WO | 2012093410 | 7/2012 | |
| WO | WO 2015/176071 A2 * | 11/2015 | G06Q 30/00 |

OTHER PUBLICATIONS

Ross, David Frederick, Frederick S. Weston, and W. Stephen. Introduction to supply chain management technologies. Crc Press, 2010.*

"Mediappraise: Mediappraise Receives National Award for Web-Based Technology That Enables Companies to Solve Thorny HR Problem," Dec. 14, 1998.

Medvinsky et al., "Electronic Currency for the Internet," Electronic Markets—The International Journal, Oct. 1993, 2 pages, vol. 3, No. 3.

metails.com, www.metails.com homepage, printed Oct. 13, 2004.

Microsoft Computer Dictionary, Fifth Edition, front matter and p. 33.

Microsoft Computer Dictionary, Fifth Edition, front matter, back matter, and pp. 479, 486.

Neches, "FAST—A Research Project in Electronic Commerce," Electronic Markets—The International Journal, Oct. 1993, 4 pages, vol. 3, No. 3.

Neo, "The implementation of an electronic market for pig trading in Singapore," Journal of Strategic Information Systems, Dec. 1992, pp. 278-288, vol. 1, No. 5.

O'Mahony, "An X.500-based Product Catalogue," Electronic Markets—The International Journal, Oct. 1993, 2 pages, vol. 3, No. 3.

"ONSALE: ONSALE Brings Thrill of Auctions and Bargain Hunting Online: Unique Internet retail services debuts with week-long charity auction for the Computer Museum in Boston," May 24, 1995, printed from www.dialogweb.com/cgi/dwclient?dwcomm-and,DWEBPRINT%20810-489267.

"ONSALE joins fray as online shopping picks up speed: Internet Booms," Computer Reseller News, Jun. 5, 1995.

Palm, Inc. Palm™ Web Pro Handbook, copyright 2002-2003.

Post et al., "Application of Auctions as a Pricing Mechanism for the Interchange of Electric Power," IEEE Transactions of Power Systems, Aug. 1995, pp. 1580-1584, vol. 10, No. 3.

Preist et al., "Adaptive agents in a persistent shout double auction," International Conference on Information and Computation, Proceedings of the first international conference on information and computation economies, Oct. 25-28, 1998, Charleston, United States, pp. 11-18.

Qualcomm, "Brew Developer Support," printed from web.archive.org/web/20020209194207/http:/www.qualcomm.com/brew/developer/support/kb/52.html on Aug. 30, 2007.

RCR Wireless News, "Lockheed Martin to use 2Roam's technology for wireless platform," RCR Wireless News, Sep. 10, 2001.

Reck, "Formally Specifying an Automated Trade Execution System," J. Systems Software, 1993, pp. 245-252, vol. 21.

Reck, "Trading-Process Characteristics of Electronic Auctions," Electronic Markets—The International Journal, Dec. 1997, pp. 17-23, vol. 7, No. 4.

repcheck.com, www.repcheck.com homepage, printed from web.archive.org/web/20020330183132/http://repcheck.com on Sep. 5, 2009.

Resnick et al., "Reputation Systems," Communications of the ACM, Dec. 2000, pp. 45-48, vol. 43, No. 12.

Rockoff et al., "Design of an Internet-based system for remote Dutch auctions," Internet Research: Electronic Networking Applications and Policy, 1995, pp. 10-16, vol. 5, No. 4.

Rose, "Vendors strive to undo Adobe lock-hold," Computer Reseller News, Feb. 5, 1996, n 66669, p. 71(7).

Rysavy, "Mobile-commerce ASPs do the legwork," Network Computing, Jan. 22, 2001, p. 71, 6 pgs., vol. 12, No. 2.

Saunders, "AdFlight to Offer WAP Ads," Oct. 17, 2000, printed from clickz.com/487531/print.

Schmid, "Electronic Markets," Electronic Markets—The International Journal, Oct. 1993, 2 pages, vol. 3, No. 3.

Schwankert, "Matsushita Taps 2Roam for Wireless Solutions," www.internetnews.com/bus-news.article.php/674811, Feb. 2, 2001.

Şen, "Inventory and Pricing Models for Perishable Products," Doctor of Philosophy Dissertation—University of Southern California, Aug. 2000.

Siegmann, "Nowhere to go but up," PC Week, Oct. 23, 1995, 3 pages, vol. 12, No. 42.

Telephony Staff, "Air-ASP," Telephone Online, Oct. 2, 2000, 3 pages.

Teo, "Organizational Factors of Success in Using EDIS: A Survey of Tradenet Participants," Electronic Markets—The International Journal, Oct. 1993, 2 pages, vol. 3, No. 3.

Tjostheim et al., "A case study of an on-line auction for the World Wide Web," printed from www.nr.no/gem/elcom/puplikasjoner/enter98e.html on Jun. 10, 1999, 10 pages.

Turban, "Auctions and Bidding on the Internet: An Assessment," Electronic Markets—The International Journal, Dec. 1997, 5 pages, vol. 7, No. 4.

ubid.com, "How do I Update my Address, Phone, Credit Card, Password, etc.?" printed from web.archive.org/web/20010208113903/www.ubid.com/help/topic13asp on Aug. 30, 2007.

ubid.com, "How do I track my shipment?" printed from web.archive.org/web/20010331032659/www.ubid.com/help/topic27.asp on Aug. 30, 2007.

ubid.com, "Can I track all of my bids from My Page?" pritned from web.archive.org/web/20010208114049/www.ubid.com/help/topic14.asp on Aug. 30, 2007.

Van Heck et al., "Experiences with Electronic Auctions in the Dutch Flower Industry," Electronic Markets—The International Journal, Dec. 1997, 6 pages, vol. 7, No. 4.

Verizon Wireless, "Verizon Wireless Customers Get It NowSM; Get Games, Get Pix, Get Ring Tones and Get Going in Full Color," press release to PRNEWSWIRE, Sep. 23, 2002.

(56) References Cited

OTHER PUBLICATIONS

Warbelow et al., "AUCNET: TV Auction Network System," Harvard Business School 9-190-001, Jul. 19, 1989, Rev. Apr. 12, 1996, pp. 1-15.
Weber, "How Financial Markets are Going On-line," Electronic Markets—The International Journal, Oct. 1993, 2 pages, vol. 3, No. 3.
Wireless Internet, "DailyShopper Selects 2Roam to Enable Mobile Customers to Retrieve Nearby Sales and Promotions Information," Wireless Internet, Apr. 2001.
Wireless Week, "Verizon Wireless Gets Going on BREW Agenda," Wireless Week, Sep. 23, 2002.
xchanger.net, webpage printed from www.auctiva.com/showcases/as_4sale.asp?uid=exchanger, undated but at least as early as Oct. 12, 2000.
Yu et al., "Distributed Reputation Management for Electronic Commerce," Computational Intelligence, 2002, pp. 535-549, vol. 18, No. 4.
Zetmeir, Auction Incentive Marketing, print of all pages of website found at home.earthlink.net/~bidpointz/ made Oct. 8, 2004.
Zimmermann, "Integration of Financial Services: The TeleCounter," Electronic Markets—The International Journal, Oct. 1993, 1 page, vol. 3, No. 3.
Zwass, "Electronic Commerce: Structures and Issues," International Journal of Electronic Commerce, Fall 1996, pp. 3-23, vol. 1, No. 1.
Ball et al., "Supply chain infrastructures: system integration and information sharing," ACM SIGMOD Record, 2002, vol. 31, No. 1, pp. 61-66.
Joshi, "Information visibility and its effect on supply chain dynamics," Ph.D. dissertation, Massachusetts Institute of Technology, 2000 (fig. 4.5; p. 45).
2ROAM, Inc., Multiple archived pages of www.2roam.com retrieved via Internet Archive Wayback Machine on Jun. 10, 2008.
Alt et al., "Bibliography on Electronic Commerce," Electronic Markets—The International Journal, Oct. 1993, 5 pages, vol. 3, No. 3.
Alt et al., "Computer Integrated Logistics," Electronic Markets—The International Journal, Oct. 1993, 1 page, vol. 3, No. 3.
Anonymous, Image manipulation (image-editing software and image-manipulation systems)(Seybold Special Report, Part II), Seybold Report on Publishing Systems, May 15, 1995, p. S35(9), vol. 24, No. 18.
auctionwatch.com, multiple pages—including search results for "expedition," printed Apr. 21, 2011.
auctiva.com, multiple pages, undated but website copyright date is "1999-2000."
Berger et al., "Random Multiple-Access Communication and Group Testing," IEEE, 1984.
Braganza, "Is Research at Cranfield—A Look at the Future," Electronic Markets—The International Journal, Oct. 1993, 1 page, vol. 3, No. 3.
Brecht et al., "The IM 2000 Research Programme," Electronic Markets—The International Journal, Oct. 1993, 1 page, vol. 3, No. 3.
Business Wire business/technology editors, "Sellers Flock to OutletZoo. com as New Automatic Price Drop Method Moves Excess Inventory Online," Business Wire, Oct. 25, 1999.
Business Wire business editors/high-tech writers, "PictureWorks Technology, Inc. Expands in Real Estate Market with Adoption of Rimfire on REALTOR.com," Business Wire, Nov. 8, 1999.
Business Wire business editors/high-tech writers, "PictureWorks Technology, Inc. Shows Strong Revenue Growth in Internet Imaging Business," Business Wire, Nov. 10, 1999.
Business Wire business editors/high-tech writers, "2Roam Partners with Pumatech to Delivery Wireless Alerts," Business Wire, Dec. 18, 2000.
Business Wire business editors/high-tech writers, "2Roam Takes eHow's How-to Solutions Wireless: With 2Roam, the Web's One-Stop Source for Getting Things Done is on More Wireless Devices, with Ability to Purchase Its Products from Anywhere," Business Wire, Oct. 2, 2000.
Business Wire business editors/high-tech writers, "2Roam Drives Hertz to the Wireless Web; Number One Car Rental Company to Provide Customers Wireless Access from Any Device," Business Wire, Aug. 7, 2001.
buy.com, www.buy.com homepage, printed Oct. 13, 2004.
Chen et al., "Detecting Web Page Structure for Adaptive Viewing on Small Form Factor Devices," ACM, May 20-24, 2003.
Clarke, "Research Programme in Supra-organizational Systems," Electronic Markets—The International Journal, Oct. 1993, 2 pages, vol. 3, No. 3.
Clemons et al., "Evaluating the prospects for alternative electronic securities markets," Proceedings of the twelfth international conference on information systems, New York, New York, United States, pp. 53-64, 1991.
friendster.com, Homepage and "more info" pages, printed Apr. 29, 2004.
Google News archive search for "2Roam marketing" performed over the date range 2000-2003.
Google News archive search for "2Roam SMS" performed over the date range 2000-2008.
Grabowski et al., "Mobile-enabled grid middleware and/or grid gateways," GridLab—A Grid Application Toolkit and Testbed, Work Package 12—Access for Mobile Users, Jun. 3, 2003.
Graham, "The Emergence of Linked Fish Markets in Europe," Electronic Markets—The International Journal, Jul. 1998, 4 pages, vol. 8, No. 2.
Gunthorpe et al., "Portfolio Composition and the Investment Horizon," Financial Analysts Journal, Jan.-Feb. 1994, pp. 51-56.
Halperin, "Toward a Process Handbook for Organizational Coordination Processes," Electronic Markets—The International Journal, Oct. 1993, 1 page, vol. 3, No. 3.
Hess et al., "Computerized Loan Origination Systems: An Industry Case Study of the Electronic Markets Hypothesis," MIS Quarterly, Sep. 1994, pp. 251-275.
IBM, "Anonymous Delivery of Goods in Electronic Commerce," IBM Technical Disclosure Bulletin, Mar. 1996, pp. 363-366, vol. 39, No. 3.
IBM, "Personal Optimized Decision/Transaction Program," IBM Technical Disclosure Bulletin, Jan. 1995, pp. 83-84, vol. 38, No. 1.
ICROSSING, "ICROSSING Search Synergy: Natural & Paid Search Symbiosis," Mar. 2007.
IEEE 100—The Authoritative Dictionary of IEEE Standard Terms, Seventh Edition, 2000. Entire book cited; table of contents, source list, and terms beginning with A included. ISBN 0-7381-2601-2.
Ives et al., "Editor's Comments—MISQ Central: Creating a New Intellectual Infrastructure," MIS Quarterly, Sep. 1994, p. xxxv.
Klein, "Information Logistics," Electronic Markets—The International Journal, Oct. 1993, pp. 11-12, vol. 3, No. 3.
Klein, "Introduction to Electronic Auctions," Electronic Markets—The International Journal, Dec. 1997, 4 pages, vol. 7, No. 4.
Kubicek, "The Organization Gap," Electronic Markets—The International Journal, Oct. 1993, 1 page, vol. 3, No. 3.
Kuula, "Telematic Services in Finland," Electronic Markets—The International Journal, Oct. 1993, 1 page, vol. 3, No. 3.
Lalonde, "The EDI World Institute: An International Approach," Electronic Markets—The International Journal, Oct. 1993, 1 page, vol. 3, No. 3.
Lee et al., "Intelligent Electronic Trading for Commodity Exchanges," Electronic Markets—The International Journal, Oct. 1993, 2 pages, vol. 3, No. 3.
Lee et al., "Electronic Brokerage and Electronic Auction: The Impact of IT on Market Structures," Proceedings of the 29th Annual Hawaii International Conference on System Sciences, 1996, pp. 397-406.
Lee, "AUCNET: Electronic Intermediary for Used-Car Transactions," Electronic Market—The International Journal, Dec. 1997, pp. 24-28, vol. 7, No. 4.
LIVE365 press release, "Live365 to Offer Opt-In Advertising on Its Website," Oct. 15, 2004.

(56) References Cited

OTHER PUBLICATIONS

London Business School, "Overture and Google: Internet Pay-Per-Click (PPC) Advertising Options," Mar. 2003.

M2 Presswire, "Palm, Inc.: Palm unveils new web browser optimised for handhelds; HTML browser offers high-speed web-browsing option," Mar. 13, 2002.

Malone et al., "Electronic Markets and Electronic Hierarchies," Communications of the ACM, Jun. 1987, pp. 484-497, vol. 30, No. 6.

Mansell et al., "Electronic Trading Networks: The Route to Competitive Advantage?" Electronic Markets—The International Journal, Oct. 1993, 1 page, vol. 3, No. 3.

Mardesich, "Onsale takes auction gavel electronic," Computer Reseller News, Jul. 8, 1996, pp. 2, 32.

Marteau, "Shop with One Click, Anywhere, Anytime," Information Management and Consulting, 2000, pp. 44-46, vol. 15, No. 4.

Massimb et al., "Electronic Trading, Market Structure and Liquidity," Financial Analysts Journal, Jan.-Feb. 1994, pp. 39-49.

McGinity, "Build Your Weapon," PC Magazine, Apr. 24, 2011, printed from www.pcmag.com/print_article2?0,1217,a%253D3955,00.asp.

Meade, "Visual 360: a performance appraisal system that's 'fun,'" HR Magazine, 44, 7, 118(3), Jul. 1999.

Chen, M. (2007), Knowledge assisted data management and retrieval in multimedia database systems (Order No. 3268643).

Fan, J., Keim, F.A., Gao, Y., Luo, H. and Li, Z. (2009). JustClick: Personalized Image Recommendation via Exploratory Search from Large-Scale Flickr Images. Feb. 2009. IEEE Transactions on Circuits and Systems for Video.

Rodriguez, Camille, HootSuite vs. social Oomph vs. Tweekdeck, Jan. 4 2012, http://polkadotimpressions.com/2012/01/04/hootsuite-vs-social-oopmphvs.tweetdeck/ (Year: 2012).

Schaffer, Neil, The Top 20 Twitter clients—HootSuite, TweetDeck and More, Jan. 31, 2012, https://maximizesocialbusinss.com/top-20-twitter-clients-2012-9175/ (Year: 2012).

\* cited by examiner

SUPPLY CHAIN MANAGEMENT SYSTEM

CROSS-REFERENCE TO RELATED APPLICATIONS

This application claims the benefit of U.S. Provisional Application No. 61/716,263, filed Oct. 19, 2012, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Present Disclosure

The present disclosure relates generally to electronic commerce, and more particularly, but not necessarily entirely, to electronic management of supply chain networks between product suppliers, online retailers and product distribution centers.

2. Description of Related Art

Electronic commerce, commonly known as e-commerce, involves the buying and selling of products or services over electronic systems such as the Internet. E-commerce draws on multiple technologies, including mobile commerce, electronic funds transfer, supply chain management, online marketing, online transaction processing, electronic data interchange (EDI), inventory management systems, and automated data collection systems.

Traditionally, e-commerce is conducted through e-commerce websites using various business models. Under one model, online sellers offer their own products to online consumers through their own proprietary e-commerce websites. These websites are considered proprietary because the sellers do not allow third-parties to sell products on the websites. In this model, sellers own and manage their own product inventory. For example, an online seller offers a range of products to consumers through its own proprietary e-commerce website. When a sale is made, the online seller ships the product from its warehouse to the purchaser.

Under another model, third-party e-commerce websites allow online sellers to offer products, but under the sellers' own names. This type of third-party website may include auction-type websites and classified-type websites. In some cases, these third-party websites provide online sellers with their own virtual store fronts. But, under this model, online sellers are typically required to manage their online transactions with consumers, including payment, inventory warehousing, and shipping.

More recently, another model has developed that allows online sellers to list products on third-party websites in a manner that is largely transparent to consumers. For example, previously proprietary e-commerce websites owned by large retailers have opened their doors to third-party sellers. These types of websites are known as third-party marketplaces in the industry. Under this model, popular online retailers partner with sellers that are able to enhance consumer experience by bringing greater product selection to their e-commerce websites. Typically, the products of both the operator of the e-commerce website and the sellers selling on the website receive equal treatment in the search results. Third-party marketplaces are particularly advantageous to small and medium sized sellers that may not have the resources to operate an e-commerce website. Examples of large online retailers operating third-party marketplaces include Overstock.com, Amazon.com, Sears.com, Ebay.com, Walmart.com, and Buy.com. In addition, it is predicted that many more third-party marketplaces may be available in the near future.

Although third-party marketplaces have benefitted sellers and online retailers, some drawbacks still exist. For example, sellers offering products through multiple third-party marketplaces must manage each marketplace account separately, which may create excessive supply chain management costs. Because of these excessive supply chain management costs, some sellers may artificially limit the number of third-party marketplaces through which they offer products. It would therefore be an improvement to provide a supply chain management system with a single integration point that lowers supply chain management costs in a manner that would benefit third-party marketplaces and sellers.

Another drawback that exists for sellers, even those using third-party marketplaces, is that more sophisticated consumers are demanding almost immediate delivery of products purchased from online retailers. In fact, total delivery time is becoming increasingly a differentiating and deciding feature for online shoppers. While large online retailers may have sufficient resources to establish large distribution supply networks, retailers of this size are few. Many third-party marketplaces require sellers to directly integrate and manage their inventory across multiple distribution centers, which adds costs to the total supply chain and is a barrier-to-entry for many sellers. However, costs often limit sellers to a single distribution center. Additionally, sellers must determine how much inventory to allocate to each third-party marketplace, and they assume the risk of having unsold inventory locked into a single retailer. Therefore, it would be a further improvement to provide an automated supply chain management system that provides sellers with a single integration point and access to multiple third-party marketplaces and third-party distribution centers.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description that follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
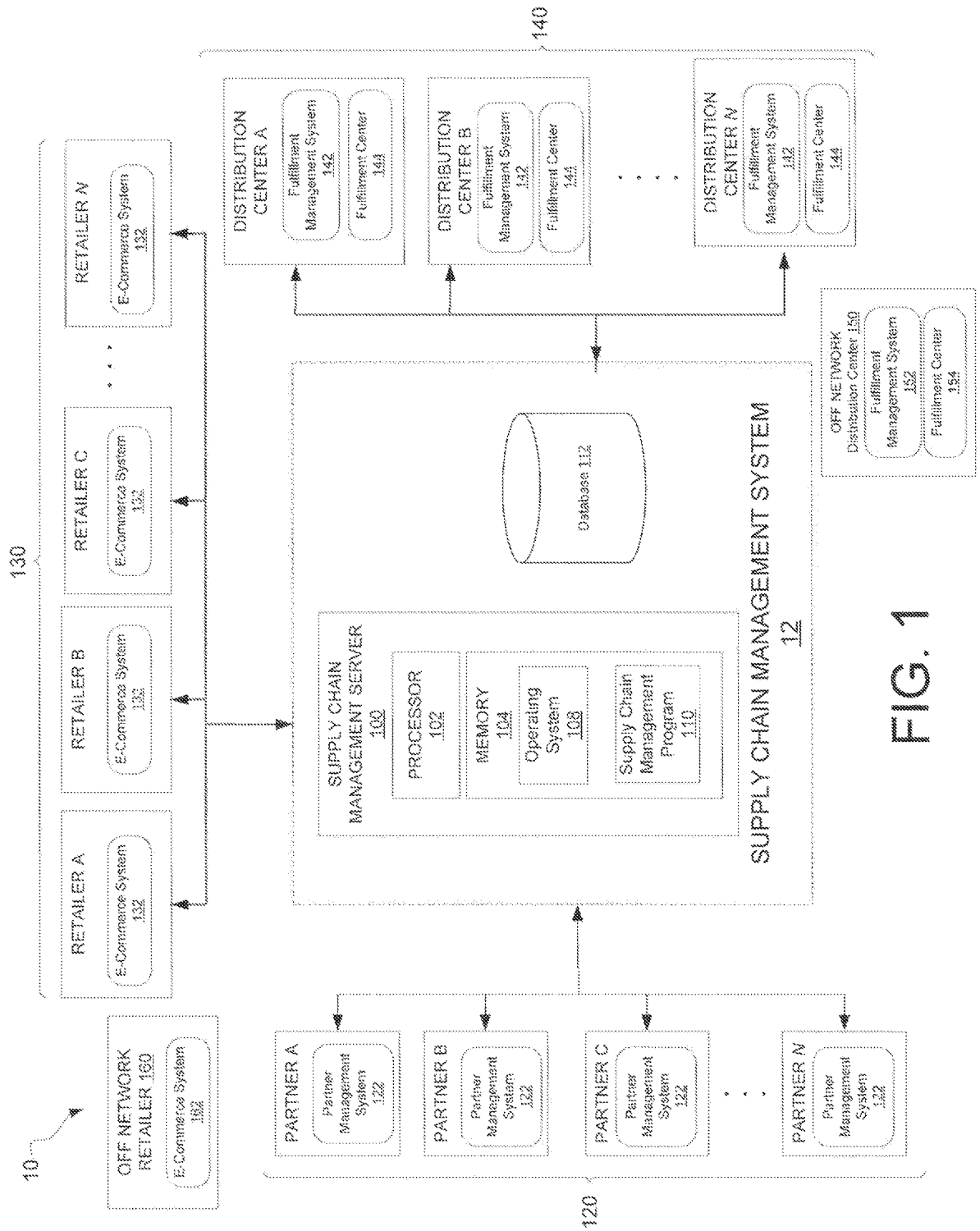
FIG. 1 is a block diagram of a framework of a supply chain management system according to an illustrative embodiment of the present disclosure.

For the purposes of promoting an understanding of the principles in accordance with the disclosure, reference will now be made to the illustrative embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. It must be noted that, as used in this specification and the appended claims, the singular forms "a," "an," and "the" include plural referents unless the context clearly dictates otherwise. As used herein, the terms "comprising," "including," "containing," "having," "characterized by," and grammatical equivalents thereof are inclusive or open-ended terms that do not exclude additional, unrecited elements or method steps.

As used herein, the term "partner" may refer to any entity that offers products for sale, typically on a wholesale level, on third-party e-commerce websites, including third-party retail marketplaces. Thus, a partner may be one of a product supplier, seller, a distributor, a wholesaler, an importer, a manufacturer, or any other entity, or individual, offering products for sale to retailers or to consumers on retailers' websites such as third-party marketplaces. A partner may operate a sales management computer program running on a sales management computer server.

As used herein, the term "retailer" or "retail marketplace" may refer to an entity that offers products for sale to consumers, sometimes referred to as end users, on a retail level. A retailer may comprise an e-commerce enterprise that offers products to consumers over a network, such as the Internet. That is, the e-commerce enterprise includes an e-commerce computer server connected to a publicly accessible network. The e-commerce computer server hosts an e-commerce website that allows consumers to purchase products. The products offered for sale by retailers may include its own products, products purchased from partners, or products offered by partners for sale even though title to the products has not been formally transferred to the retailer.

As used herein, the term "distribution center" may refer to an operation that includes a warehouse for storing and managing inventory of product. As used herein, a distribution center may or may not be associated with a partner or a retailer or another distribution center. That is, the distribution center may be independently operated. In an embodiment, the distribution centers may physically manage inventory of product offered for sale by others, including partners and the retailers. That is, distribution centers may fulfill shipping orders from retailers and partners.

In view of the foregoing, various illustrative embodiments of the present invention, for example, advantageously provide systems, computer-readable media, programs and methods for providing supply chain management on a network, which provides partners with a single integration point and access to multiple retail marketplaces and distribution centers. For example, various embodiments of systems, computer readable media, programs and methods of the present invention allow partners to submit partner data using multiple integration input methods, including EDI, AS2, API, and a web user interface. The partner data from any of the input method are processed to generate a standardized output transaction. Based on the partner configuration, the standardized output transaction is routed to only those endpoints, i.e., retail marketplaces, with which the partner has established a transactional relationship.

The systems, computer readable media, programs, and methods of the present invention may facilitate various transactions between partners, retailers, and distribution centers, including, but not limited to, purchase orders, shipment orders, inventory masters, advanced shipping notice, shipment confirmation, receipts, inventory adjustments, inventory allocation, total inventory, product definition, product attribution, product binary data, and product cost.

In various illustrative embodiments of systems, computer-readable media, programs and methods of the present invention, partners may create a product definition for each of the product they wish to offer for sale or carry in their inventory. The product definitions may be stored in a centralized database that is made available to one or more retail marketplaces that offer the products for sale to consumers through an e-commerce website. The product definitions may include product dimensions, weights, and quantities. The retail marketplaces may download the product definitions from the centralized database such that the partners only need to upload the product definitions a single time.

In various illustrative embodiments of systems, computer-readable media, programs, and methods of the present invention, partners may define marketplace preferences to include or exclude individual retail marketplaces from offering their products. For example, partners may include or exclude individual retail marketplaces or retailers by making selections from a list of available retail marketplaces generated by the supply chain management system. Based on the partners' marketplace preferences, transactional relationships are established between partners and retail marketplaces.

In various illustrative embodiments of systems, computer-readable media, programs, and methods of the present invention, partners may be provided with recommended physical locations for product distribution points based on the partners' transactional relationships with the retail marketplaces. In addition, the systems, computer readable media, programs, and methods of the present invention may provide cost estimates and provide inventory allocation recommendations for each of the retail marketplaces with whom a partner has an established transactional relationship.

In various illustrative embodiments of systems, computer-readable media, programs, and methods of the present invention, once transactional relationships are defined and product locations are determined, the invention will establish a 4-way relationship between product, partner, retail marketplace, and distribution center. This relationship may be stored and used to route all subsequent transactions. For example, e-commerce transactions through the retail marketplaces may be routed based on product, partner, and retailer relationships. These transactions may include purchase order, shipment orders, inventory master, advanced shipping notice, shipment confirmation, receipts, inventory adjustments, inventory allocation, and total inventory.

In various illustrative embodiments of systems, computer readable media, programs, and methods of the present invention, partners are provided with aggregated inventory information for multiple distribution centers, even where the distribution centers are operated by independent third parties. Partners and retail marketplaces may receive normalized and aggregated transactions regardless of the number or type of distribution center locations or providers. For example, if a partner has products located in three warehouses, each warehouse provides a daily inventory update. The invention may identify inventory transactions by the partner to create a single inventory update.

In various illustrative embodiments of systems, computer readable media, programs, and methods of the present invention, participating partners, distribution centers and retail marketplaces are provided with aggregated transaction files. For example, the invention will process orders from all participating retail marketplaces and then determine the products' location, and then create a single transaction payload for each distribution center.

In various illustrative embodiments of systems, computer-readable media, programs, and methods of the present invention, participating partners may define inventory allocation rules. For example, partners may define inventory allocation rules that best reflect their sales strategies. The partners may be provided with, and select from, a list of available inventory allocation algorithms.

In various illustrative embodiments of systems, computer readable media, programs, and methods of the present invention, retailers and marketplaces are provided with a consolidated product interface and product catalog.

In various illustrative embodiments of systems, computer-readable media, programs, and methods of the present invention, a first-cost marketplace is generated and provided to retail marketplaces. For example, partners upload product catalogs with relevant product attributes, including first cost. Retail marketplaces may be provided with access to the catalog and can create business logic to help select relevant products to make available onsite.

In various illustrative embodiments of systems, computer-readable media, programs, and methods of the present invention, retail marketplaces define a product level business logic/data model. The model consumes partner product data, evaluates product attributes, and qualifies products against retailer provided product specifications or business logic. The qualified products may then be offered on the appropriate retail marketplaces. Product that has been qualified and accepted by a retailer is automatically aggregated and included in subsequent inventory transactions. In various illustrative embodiments of systems, computer-readable media, programs, and methods of the present invention, partners are provided with a consolidated distribution service that eliminates cost from the supply chain and provides partners with a single integration point.

Referring now to FIG. 1, there is depicted a block diagram of an exemplary embodiment of a framework 10 of a supply chain management environment according to an illustrative embodiment of the present disclosure. By implementing the integration standards disclosed and providing unbiased transaction processing, the framework 10 provides an easy-to-use, cost-effective system, processes and computer-readable medium to manage warehousing, distribution, inventory allocation and sales through multiple, independent online retail channels. In an illustrative embodiment, the framework 10 of the present disclosure decreases overall supply chain costs and provides retailers the ability to decrease delivery time to consumers. In an illustrative embodiment, the framework 10 facilitates the creation of an electronically interconnected community of partners, retailers, and distribution centers.

The framework 10 may include a central supply chain management system 12. It will be appreciated that the system 12 may include a collection of computer systems, computer-readable media, computer programs, and computer-implemented processes such that the system 12 provides partners with a single integration point and access to multiple independently operated retail marketplaces and distribution centers.

In an illustrative embodiment, the system 12 may comprise a supply chain management server 100. The server 100 includes a processor 102 coupled to a memory 104. Loaded in the memory 104 are programs containing computer-readable instructions that are executable by the processor 102. The programs include an operating system 108 as is known to those having skill in the art. In addition, the memory 104 has loaded therein a supply chain management program 110.

The supply chain management program 110 comprises computer-readable instructions that, when executed by the processor 102, cause the processor 102 to carry out the functionality and features of the supply chain management system 12 as described herein. In an illustrative embodiment, an operator may enter commands and information into the server 100 through input devices (not shown) such as a keyboard and a pointing device, such as a mouse. In an illustrative embodiment, the server 100 is connected to a network, such as the Internet, to provide access to remote computing devices utilized by partners, retailers, and distribution Centers. The computer server 100 is connected to a database 112 residing on an electronic storage device, such as a hard drive or an array of hard drives as known to those of ordinary skill in the art.

In an illustrative embodiment, the supply chain management server 100 comprises a collection of computer servers, each having its own processor, that are connected to an internal, or external, network in what is commonly referred to as a "server farm," with each server performing unique tasks or the group of servers sharing the load of multiple tasks. Each server of the server farm may include a processor coupled to a memory. The server farm is scalable as is known to those skilled in the art to accommodate large demand on the supply chain management system 12. For example, the server 100 may comprise a server farm having a plurality of servers, where a first portion of the servers is dedicated to carry out the functions and features provided to partners, where a second portion of the servers is dedicated to carry out the functions and features provided to retailers, and where a third portion of the servers is dedicated to carry out the functions and features provided to distribution centers. The supply chain management server 100 may host a website that is accessible from remote computers.

In an illustrative embodiment, a plurality of partners 120 may access the supply chain management system 12 from remote computers through the website hosted by the server 100. In particular, each of the partners 120 may access the supply chain management server 100 from a partner management system 122 over a network, such as the Internet. Each partner 120 management system 122 may include a computer having a processor and a memory as known to those of ordinary skill in the art.

Partners 120 may access the features of the server 100 through a web browser running on the partner management systems 122. In an illustrative embodiment, each of the plurality of partners 120 completes a registration process with the server 100 to establish a user account with the system 12. Account information of the partners 120 may be stored in the database 112 by the server 100.

Each of the partner management systems 122 may further include a database for storing product listing information, including product images, product descriptions, product attributes, and pricing information for products offered by the partners 120. It will be further appreciated that each of the partner management systems 122 may exchange data with the supply chain management system 12 as will be explained in more detail hereinafter.

In an illustrative embodiment, a plurality of retailers 130 may access the supply chain management system 12 from remote computers through the website hosted by the server 100. In particular, each of the retailers 130 may access the supply chain management server 100 from an e-commerce system 132 over a network, such as the Internet. Each e-commerce system 132 may include a computer having a processor and a memory as known to those of ordinary skill in the art. Retailers 130 may access the features of the server 100 through a web browser running on a computer of the e-commerce system 132. In an illustrative embodiment, each of the plurality of retailers 130 completes a registration process with the server 100 to establish a user account with the system 12. The retailers' 130 account information may be stored in the database 112 by the server 100.

It will be appreciated that the e-commerce systems 132 of the retailers 130 provide e-commerce websites that allow e-commerce transactions with consumers as known to those of ordinary skill. In an illustrative embodiment, the e-commerce system 132 of each of the retailers 130 provides a third-party marketplace that allows partners, including partners 120, to offer products for sale on the e-commerce websites of the retailers 130. Each of the e-commerce systems 132 may further include a database for storing product listing information, including product images, product descriptions, product attributes, and pricing information as known to those of ordinary skill. It will be further appreciated that each of the e-commerce systems 132 may exchange data with the supply chain management system 12 as will be explained in more detail hereinafter.

Thus, pursuant to the present invention, a retailer 130 offers products for sale on its e-commerce website. For example, using web browsers operating on a remote computers, consumers are able to access a website hosted by an e-commerce system 132 of a retailer 130. Through the website, consumers are able to browse product listings on the e-commerce website. The e-commerce website may provide a search feature that allows consumers to search for desired products on the website as known to those of ordinary skill. In addition, the e-commerce website may provide an interactive hierarchical product listing. Further, each of the websites hosted by the e-commerce systems 132 provide a checkout procedure that allows consumers to purchase product from the retailer 130. As known to those of ordinary skill in the art, an online checkout procedure typically requires a consumer to enter name, payment information, and a shipping address.

In an illustrative embodiment, a plurality of distribution centers 140 may access the supply chain management system 12 from remote computers through the website hosted by the server 100. In particular, each of the distribution centers 140 may access the supply chain management server 100 from a fulfillment management system 142 over a network, such as the Internet. Each fulfillment management system 142 may include a computer having a processor and a memory as known to those of ordinary skill in the art. Distribution centers 140 may access the features of the server 100 through a web browser running on a computer of the fulfillment management system 142. In an illustrative embodiment, each of the plurality of distribution centers 140 completes a registration process with the server 100 in order to establish a user account with the system 12. The distribution centers' 140 account information may be stored in the database 112 by the server 100.

The distribution centers 140 may manage product inventory for third parties. In particular, third parties, such as partners 120, may ship product to the distribution centers 140. Product information about the products may be entered into the fulfillment management system 142. The product information may include owner information, universal product identification, and quantity. The product information may further include information necessary for shipping the product through a common carrier, including product dimensions and weight. The product received at the distribution centers 140 may be stored at fulfillment centers 144. The fulfillment centers 144 may warehouse the products until shipping order instructions are received from the system 12. In response to the instructions, the fulfillment centers 144 package and ship the product as will be explained in more detail hereinafter. The fulfillment management system 142 may exchange data with the system 12 as will be explained in more detail hereinafter.

It will be appreciated that the partners 120, the retailers 130, and the distribution centers 140 may form a community of electronically connected users on the system 12. As will further be explained below, the system 12 allows the partners 120, the retailers 130, and the distribution centers 140 to easily form business and transactional relationships.

Figure 2:
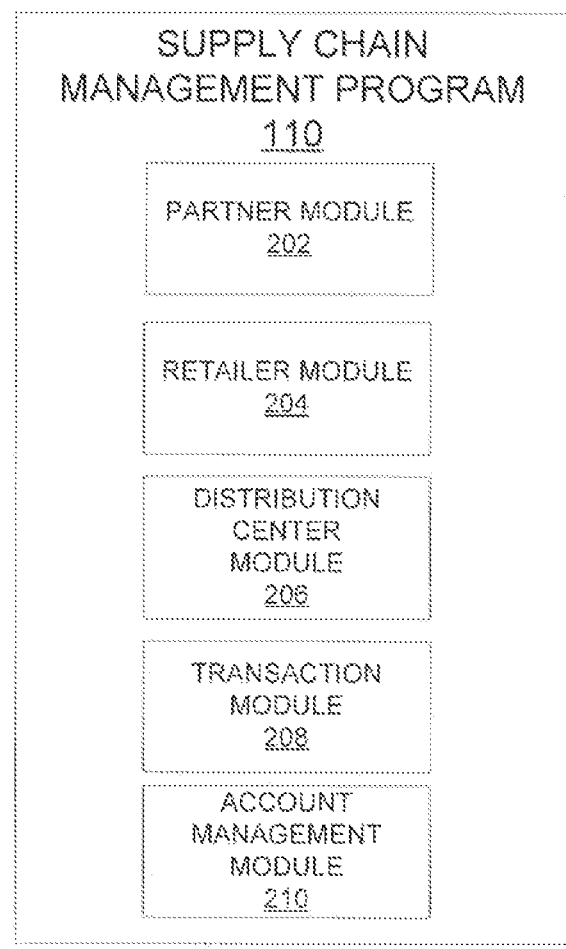
FIG. 2 is a block diagram of a supply chain management program according to an illustrative embodiment of the present disclosure.

Referring now to FIGS. 1 and 2, the supply chain management program 110 may include a partner module 202, a retailer module 204, a distribution center module 206, a transaction module 208, and an account management module 210. The functionality and features provided by these modules 202-210, when executed by the processor 102, will be described below.

Partner Module

The partner module 202 allows partners 120 to interface and exchange data with the system 12. In particular, the partner module 202 provides access to the features and functionality of the system 12 for the partners 120. In this regard, the partner module 202 serves as a gateway to the system 12 to exchange data for the partners 120 using partner management systems 122.

In an illustrative embodiment, a partner management system 122 may include a remote computing device having a processor and a memory. It will be appreciated that the remote computing device may include a desktop computer, a laptop computer, a tablet computer, a smart phone, a server computer, or any other smart device with computer networking capability. In an illustrative embodiment, the remote computing device of the partner management system 122 may access the system 12 over a publicly accessible network, such as the Internet.

Through the partner management systems 122, partners 120 interface with the system 12. In an illustrative embodiment, the partner module 202 provides partners 120 with multiple integration input methods, including, but not limited to, EDI, AS2, API, and a web UI, to exchange data with the system 12. Partners 120 may receive subsequent transactions through their chosen integration method which may include, without limitation, AS2, EDI, CSV, XML, mobile, and email. It will be appreciated that data exchange between the partner management system 122 and the system 12 can use any data exchange method now known, or known in the future.

The partner module 202 receives data from the partner management system 122 using any of the input methods and creates a standardized output transaction. The standardized data are then stored in the database 112. Based on the configuration of a partner 120, the standardized output transaction is routed to those endpoint entities, retailers 130 and distribution centers 140, with which the partner 120 has established a transactional relationship.

Using the partner module 202, partners 120 upload product information for each of the products they wish to offer for sale or carry in their inventory. In particular, the product information may be uploaded from a database of the partner management system 122 and stored in the database 112 by the partner module 202. The product information may be standardized by the partner module 202 prior to storing in the database 112. The product information may include product images, product attributes, product description, price, ratings, and any other information to facilitate the sale of the products to consumers.

The product information may also include product dimensions, weights, and available quantities. The product information may be stored in the database 112 in association with the accounts of the partners 120 with the system 12. In an illustrative embodiment, the product information may be stored in the database 112 in association with product catalogs of the partners 120. The partner module 202 may provide electronic forms and interfaces to facilitate the upload of the product information from the partner management systems 122. The upload of the product information to the system 12 may be performed manually or through an automated process.

Figure 3:
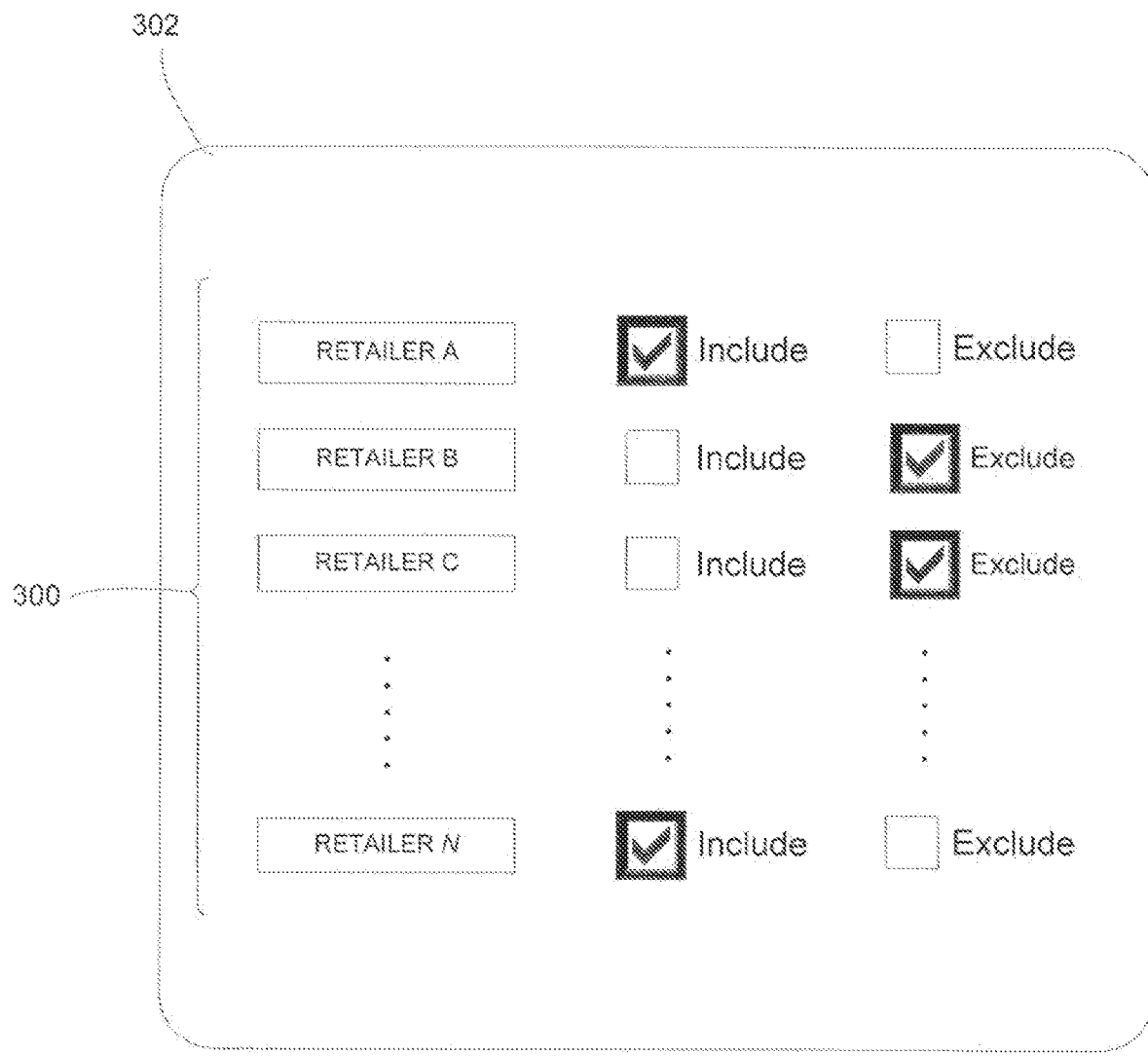
FIG. 3 is a diagram of an exemplary display of a retailer inclusion/exclusion list generated by the supply chain management system shown in FIG. 1 according to an illustrative embodiment of the present disclosure.

In an illustrative embodiment, the partner module 202 may generate a list 300 of available retailers 130 registered on the system 12 as can be observed in FIG. 3. This list 300 is displayed on a display 302 of the partner management systems 122. Using the list 300, which may be interactive, searchable, and sortable, partners 120 select those ones of the retailers 130 with whom the partners 120 desire to establish a transactional relationship. That is, through the interface, partners 120 can input retailer selection preferences to include and exclude retailers 130. A retailer 130 selected by a partner 120 is able to offer for sale those products listed in the database 112 by that partner 120. A retailer 130 that has been excluded by a partner 120, on the other hand, is prohibited from offering for sale those products listed in the database 112 by that partner 120. The decision to include or exclude any particular retailer 130 may be based on business objectives. Based on the qualification process and the inclusion/exclusion preferences of the partners 120, a transactional relationship will be established between each partner 120 and their selected or included ones of the retailers 130.

Figure 4:
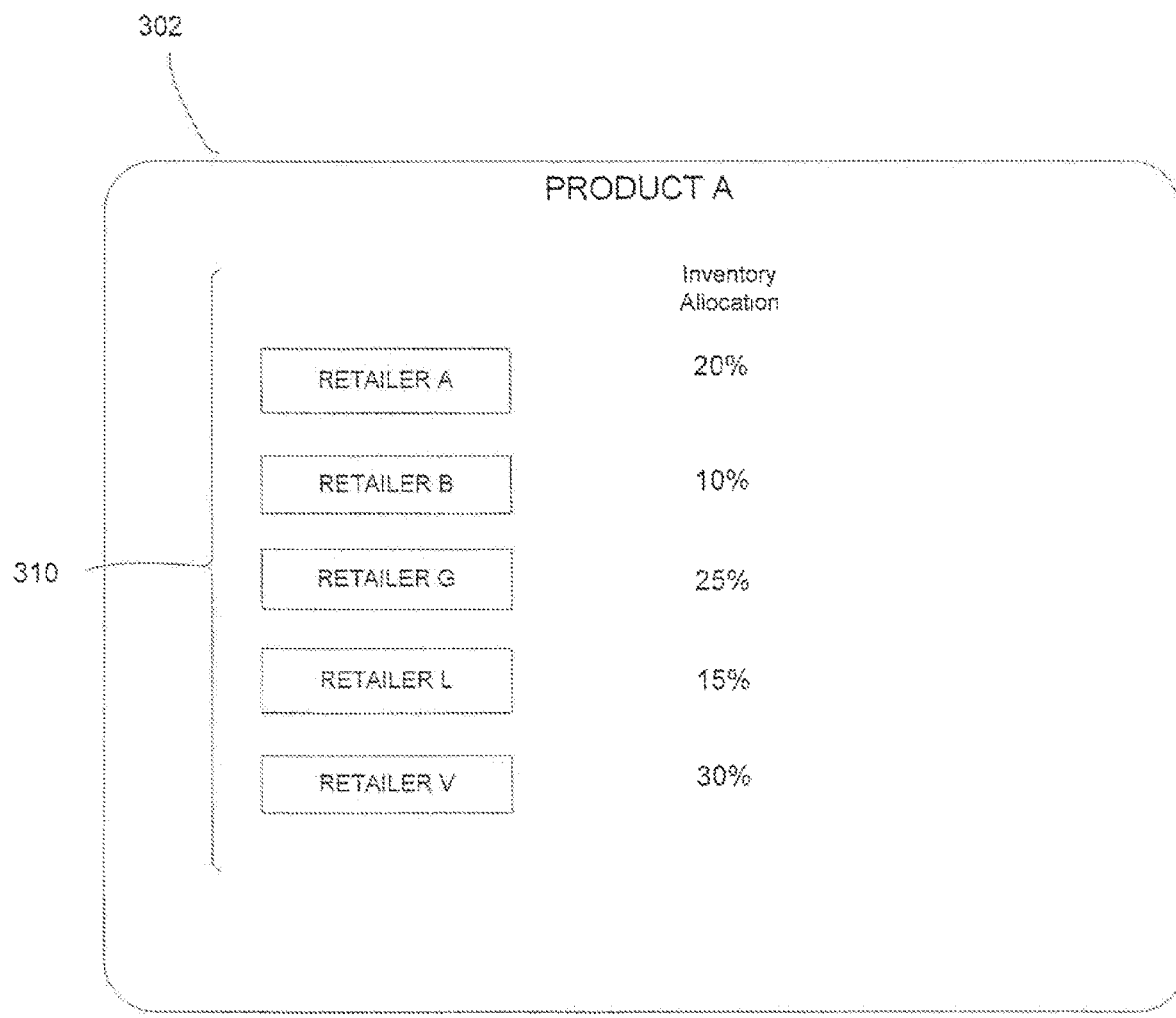
FIG. 4 is a diagram of an exemplary display of an inventory allocation list generated by the supply chain management system shown in FIG. 1 according to an illustrative embodiment of the present disclosure.

In an illustrative embodiment, partners 120 are able to allocate inventory differently between the selected ones of the retailers 130 using the partner module 202. That is, a partner 120 may define product allocation preferences that allocate more inventory to one retailer 130 than to another. For example, as shown in FIG. 4, the partner module 202 may generate an exemplary list 310 of the selected ones of the retailers 130 on a display 302 of a partner management system 122.

In an illustrative embodiment, the partner module 202 may provide a plurality of inventory allocation methods that allows the partners 120 to select an inventory allocation method that best reflects their sales strategy. The selection provides a spectrum of choices designed to maximize available inventory across multiple retailers 130 and minimize short-ship risks. In an illustrative embodiment, the choices include, without limitation:

- Minimize Short-Ship: Retailer Inventory=(Available_Inventory−(Total_SKU_Sales/Time_in_Period))/Count_of_Retailers
- Maximize Inventory: Retailer Inventory=((Available_Inventory*Count_of_Retailers)−(Total_SKU_Sales/time_in_period))/Count_of_Retailers
- Absolute Reserve: Retailer Inventory=(Available_Inventory−Partner_Reserve)/Count_of_Retailers
- Retailer Reserve: Retailer Inventory=Retailer_Reserve+((Available_Inventory−S(All_Retailer_Reserves))/Count_of_Retailer)
- Weighted Retailer: Retailer Inventory=(Retailer_SKU_Sales/Time_in_Period)+(Available_Inventory−S(All_Retailer_SKU_Sales/Time_in_Period)/Count_of_Retailer)

It will be appreciated that other inventory allocation methods may be utilized by the present invention. The inventory allocation methods may be chosen for an entire product catalog or on a product-by-product basis.

Figure 5:
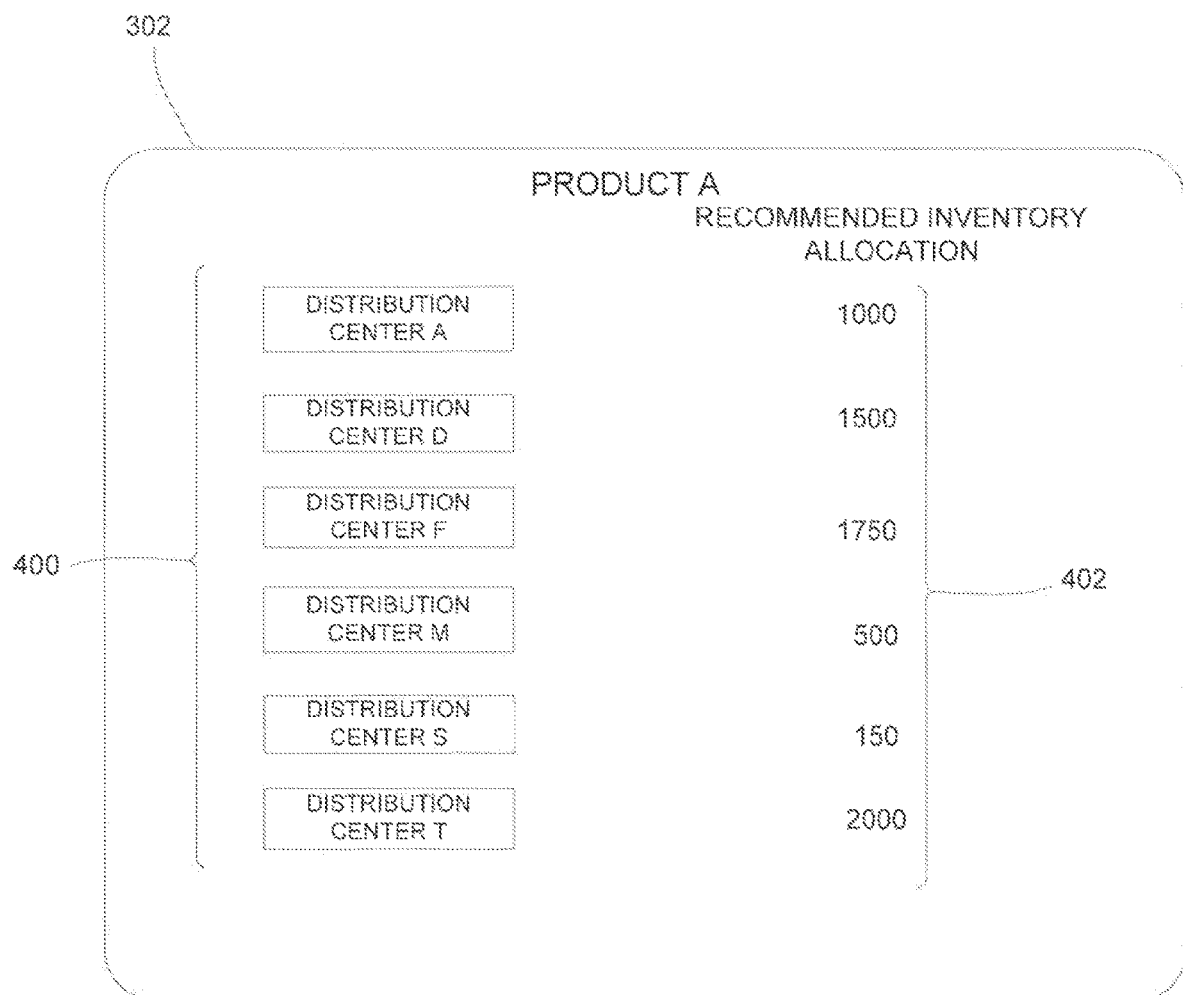
FIG. 5 is a diagram of an exemplary display of an inventory allocation list generated by the supply chain management system shown in FIG. 1 according to an illustrative embodiment of the present disclosure.

Based on the transactional relationships and the selected inventory allocation methods, the partner module 202 will analyze the network data and recommend select ones of the distribution centers 140 for product distribution, provide a cost estimate, and provide inventory allocation recommendations amongst the different distribution centers. In particular, the distribution centers 140 may be selected for each of the partners 120 based on geographic proximity to consumers of the retailers 130. For example, shown in FIG. 5 is a recommended list 400 of distribution centers 140 and a recommended inventory allocation list 402 for Product A as shown on a display 302 of a partner management systems 122. The partner 120 may then ship product to the identified ones of the distribution centers 140 in accordance with the recommended inventory allocation.

Once transactional relationships between partners 120 and retailers 130 are defined and product distribution center locations are identified, the partner module 202 will establish a 4-way relationship between product, partners 120, retailers 130 and distribution center(s) 140. These relationships are stored in the database 112 and are used to route all subsequent transactions, as will be explained in more detail below.

Retailer Module

The retailer module 204 allows retailers 130 to access the features and functionality of the system 12 from a remote computing devices, namely, a computer associated with the e-commerce systems 132. As mentioned above, once a retailer 130 has registered with the system 12, partners 120 may select the retailer 130 as being qualified to sell the products of the partners 120 to consumers. Likewise, retailers 130 may select which of the products of the partners 120 they wish to offer on their respective e-commerce systems 132. To accomplish this feature, the retailer module 204 defines a customized e-product marketplace in the database 112 for each retailer 130. The customized e-product marketplace will allow a retailer 130 to select product from all of those partners 120 that have chosen to include that retailer 130 in their qualified list of retailers.

For example, if Partners A and B may have selected Retailer A as a qualified retailer of their products, the retailer module 204 would generate a customized e-product marketplace for Retailer A that includes the products of both Partners A and B that were previously uploaded to the database 112. Thus, it will be appreciated that the retailer module 204 generates a unique and customized e-product marketplace for each retailer 130. That is, each e-product marketplace has a customized product selection of qualified products offered to a retailer 130 by the partners 120.

In an illustrative embodiment, once a retailer 130 accesses a customized e-product marketplace, the retailer 130 is able to browse products offered for sale through the system 12. For example, the retailer 130 is able to view product images, review product information, pricing information, and inventory information stored in the database 112.

In an illustrative embodiment, retailers 130 are able to manually select desired products in the e-product marketplace created and maintained by the server 12. Thus, if a retailer 130 determines that it desires to offer for sale on its e-commerce website one of the products offered by a partner 120, the retailer 130 selects the product in the e-product marketplace. In an illustrative embodiment, the retailer 130 also selects a quantity of each product that it desires to offer for sale.

In an illustrative embodiment, the products listed for sale in the e-product marketplaces may be presented as in a catalog format. The retailer module 204 provides a search feature that allows retailers 130 to search for desired products. In addition, the retailer module 204 provides a browse feature. In addition, the retailer module 204 may provide a listing of the most purchased products, the highest rated, or any other useful product category.

In an illustrative embodiment, the retailer module 204 provides an interface that allows a retailer 130 to input business logic that defines product selection preferences that are utilized to select products that will be sold on the e-commerce website operated by the retailer 130. The business logic may define product attributes of desirable products. For example, if the retailer's e-commerce website primarily sells products related to horses, the business logic may specify product attributes typically related to horses, such as riding gear, halters, saddles, etc. The product attributes defined by the business logic are then compared against the product attributes of the products listed in the e-product marketplace to find product matches.

In an illustrative embodiment, using the business logic defined by the retailers 130 and the retailer inclusion/ exclusion parameters defined by the partners 120, the retailer module 204 automatically matches products to retailers 130. Stated another way, matchmaking involves the retailer module 204 matching products in the database 112 to a retailer 130 based on (1) the business logic, or product selection preferences, defined by the retailer 130; and (2) the retailer inclusion/exclusion preferences defined by the partners 120. Again, the retailer module 204 may automatically select products in the database 112 for each retailer 130 based on these two factors. It will be appreciated that the matchmaking process described above greatly facilitates and automates product selection.

Figure 6:
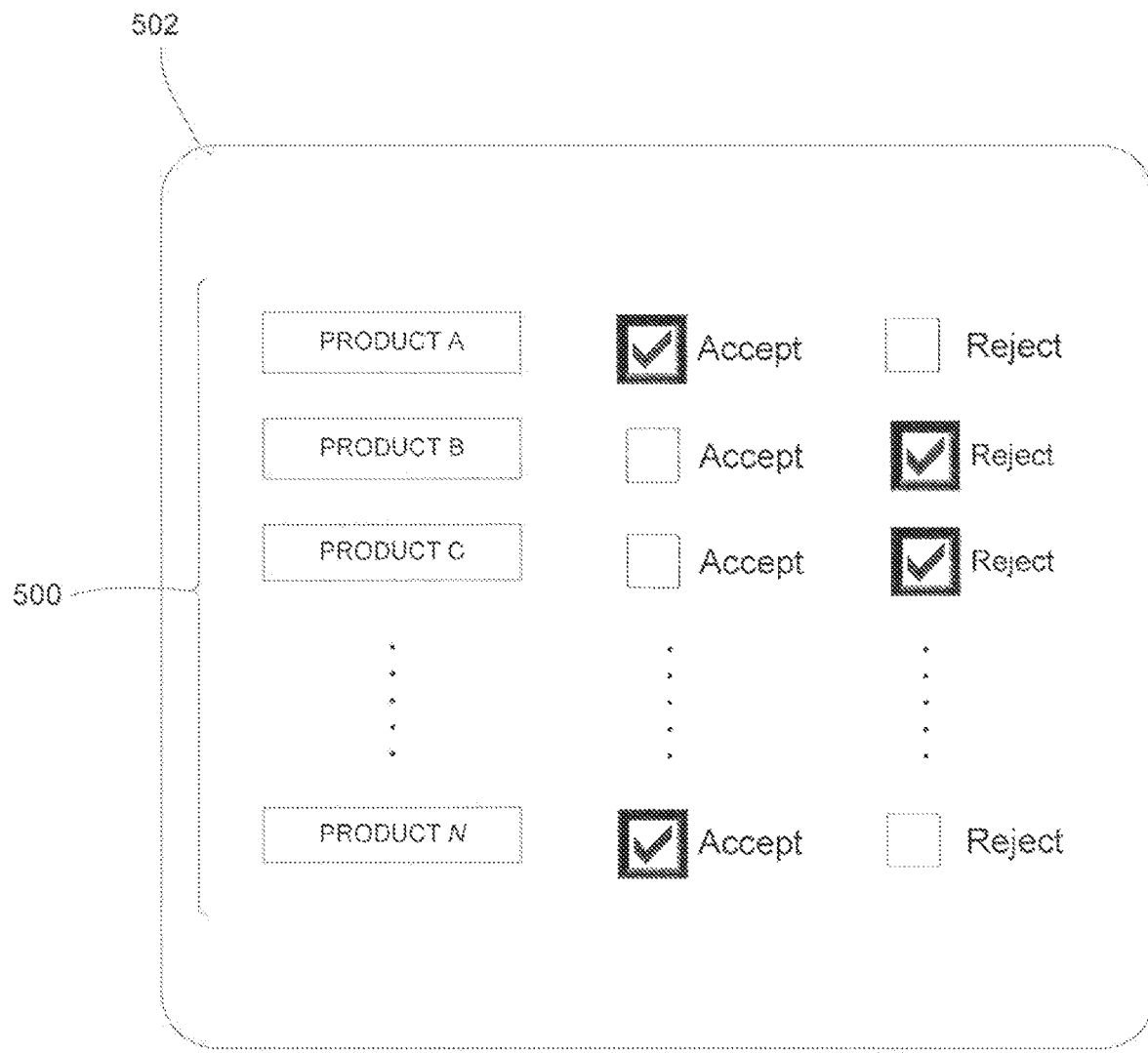
FIG. 6 is a diagram of an exemplary display of an e-marketplace generated by the supply chain management system shown in FIG. 1 according to an illustrative embodiment of the present disclosure.

In an illustrative embodiment, the retailer 130 may then manually accept or reject the products identified in the matchmaking process. For example, as shown in FIG. 6, the retailer module 204 may generate a list 500 of products identified by the matching process on a display 502 of an e-commerce system 132. The retailer 130 may then manually accept or reject the product for inclusion for sale on the e-commerce system 132. The products may be accepted and rejected on a product-by-product basis, by product category, by partner, by price, by product attribute, or in any other product groupings.

Once the products have been selected, either manually or by the matchmaking process described above, the retailer module 204 then provides a download of the pertinent product information to a destination indicated by the retailers 130. Using the provided product information, the retailers 130 are able to list the product for sale on their respective e-commerce websites using the downloaded product information. Importantly, the retailer 130 has not been shipped the product even though the product is offered for sale on the retailer's 130 e-commerce website. In an illustrative embodiment, the e-commerce system 132 of a retailer 130 dynamically generates a product webpage that links to the product information in the database 112 such that the retailer 130 does not need to separately maintain the product information.

It will be appreciated that the retailer module 204 provides a consolidated product interface and catalog for multiple retailers and/or marketplaces. The retailer module 204 accommodates various integration methods, including Web services, XML, CSV, API, http, and https. In an illustrative embodiment, the retailer module 204 creates a first-cost, or wholesale, marketplace. That is, partners 120 can upload their entire product catalog with relevant product attributes, including first cost, to the database 112. Retailers 130 may have access to the catalogs, if qualified by the partners 120, and can create business logic, i.e., product selection preferences, to help select relevant products to make available on their websites.

In an illustrative embodiment, the retailer module 204 includes product level business logic/data model. The business logic consumes partner product data, evaluates the product attributes and qualifies products against retailer provided product specifications. Products that have been qualified and accepted by a retailer 130 are automatically aggregated and included in subsequent inventory transactions.

Distribution Center Module

The distribution center module 206 allows the distribution centers 140 to access the features and functionality of the supply chain management system 12 from remote computing devices, namely, computers of the fulfillment management systems 142. In an illustrative embodiment, the distribution center module 206 integrates and aggregates multiple distribution centers 140 and the associated inventory into a single access point.

In an illustrative embodiment, partners 120 ship product inventory to the distribution centers 140. The partners 120 may ship the inventory in accordance with the inventory allocation recommendations generated by the partner module 202. When an order is placed by a consumer with a retailer 130, the retailer 130 generates a shipping order, which is routed through the system 12 to the appropriate distribution center 140. The distribution center 140 then ships the product to the consumer specified in the shipping order. The distribution center 140 then generates an advanced shipping notice, which is routed through the system 12 to the retailer 140 that sold the product. In short, the distribution centers ship product to the consumers that order the product through the retailers' 130 websites. Further, the distribution center module 206 will accommodate various integration methods, including EDI and AS2.

In an illustrative embodiment, a primary function of the distribution centers 140 are to route transactions based on product, partner, and retailer transactional relationships defined by the database of the system. Transactions processed by the distribution centers 140 may include: Purchase Orders, Shipment Orders, Inventory Master, Advanced Shipping Notice, Shipment Confirmation, Receipts, Inventory Adjustments, Inventory Allocation, and Total Inventory. In an illustrative embodiment, partners 120 and retailers 130 will receive normalized and aggregated transactions regardless of the number or type of distribution centers 140 locations or providers.

For example, if Partner A has product located in three distribution centers 140, each distribution center 140 provides a daily inventory update. The distribution center module 206 identifies inventory transactions for a partner 120 and aggregates the data into a single aggregated inventory update.

In an illustrative embodiment, retailers 130 and/or partners 120 will provide aggregated transaction files. The distribution center module 206 will process orders from all participating retailers 130 and determine the optimal product location, then the distribution center module 206 will create a single transaction payload for each distribution center 140. In an illustrative embodiment, the optimal product location is the distribution center 140 closest to the destination shipping address for the product. In an illustrative embodiment, the retailer 120 may select the distribution center 140 that will ship the product and include this information with the shipping order.

Account Management Module

The account management module 210 provides a registration process to its users, namely, partners 120, retailers 130, and distribution centers 140. It will be appreciated that the number of partners 120, retailers 130, and distribution centers 140 that register with the supply chain management system 12 may be unlimited, subject only to the capacity requirements of the system 12. In an illustrative embodiment of the present disclosure, the partners, retailers, and distribution centers are independently operated and unrelated entities.

In an illustrative embodiment, the registration process may be completed online, such as over the Internet. For example, the partners 120, retailers 130, and distribution centers 140 may access the system 12 through a website. The partners 120, retailers 130, and distribution centers 140 may be provided with a secure login ID and password as is known to those skilled in the art.

Off Network Retailers

Referring to FIG. 1, the supply chain management system 12 may provide a feature that allows partners 120 to ship products to consumers from the distribution centers 140 for purchases made through off network retailers 160. As used herein, off network retailers 160 are retailers that offer for sale products of one or more partners 120 on an e-commerce system 162. The off network retailers 160 are not registered with the system 12. When a consumer purchases a product from an off network retailer 160, the off network retailer 160 may send a shipping order to the appropriate partner 120. The partner 120 may then generate an off network shipping order, which is sent to the system 12. The system 12 then generates a shipping order, which is sent to the appropriate distribution center 140. The distribution center 140 will then ship the order to the consumer and provide a shipping confirmation back to the partner 120 through the system 12.

Off Network Distribution Centers

Referring to FIG. 1, the supply chain management system 12 may provide a feature that allows partners 120 to ship products to consumers from off network distribution centers 150 for purchases made through retailers 130. As used herein, off network distribution centers 150 are distribution centers that fulfill shipping orders for one or more partners 120, but that are not registered with the system 12. In an embodiment, the off network distribution centers 150 may include a fulfillment management system 152 and a fulfillment center 154 similar to the fulfillment management system 142 and the fulfillment center 144, respectively. In an embodiment, the off network distribution centers carry an inventory of product offered for sale by one or more partners 120. If a retailer 120 registered with the system 12 generates a shipping order, it is routed by the system 12 back to the appropriate partner 120. The partner 120 may then send the shipping order to the off network distribution center 150.

Transaction Module

Referring to FIG. 1, the following Table 1 describes the various data exchanges between partners 120 and the supply chain management system 12 that may be performed by the transaction module 208, or another appropriate module of the system 12.

TABLE 1

| | |
|---|---|
| Inclusion/Exclusion | Partners are able to select which retailers they want to do business with through the partner module. The supply chain management system generates a list of retailers and the partners are able to select the ones which will be qualified to offer the partners' products to consumers. Thus, partners are able to "include" or "exclude" retailers by defining retailer inclusion/exclusion preferences. This information is stored in the database by the supply chain management system. |
| Product Information | Partners upload product information to the supply chain management system regarding the products that are offered to consumers through retailers. The product information includes, without limitation, product attributes, price, product descriptions, product images, or any other product information. The product information is stored in the database. |

TABLE 1-continued

| | |
|---|---|
| Fulfilled Orders | The supply chain management system informs the partners of fulfilled orders, i.e., product shipped by the distribution centers. |
| Outstanding Orders Off Network | Outstanding orders off network are shipping orders for registered retailers that must be fulfilled from the partners' off network distribution centers. |
| Off Network Inventory | Off network inventory is the partners' inventory maintained in the off network distribution centers. |
| Off Network Orders | Off network orders are shipping orders from non-registered Retailers. The shipping orders are fulfilled by the registered distribution centers. |
| Purchase Orders | Partners provide purchase orders to the supply chain management system. The supply chain management system then forwards this information to the registered distribution centers such that the distribution centers know what products are being shipped to them. |
| Product Allocation | Partners can define inventory allocation rules, or product allocation preferences. These inventory allocation rules allow Partners to select an inventory allocation method which best reflect their sales strategy. The supply chain management system provides a spectrum of different inventory allocation strategies to maximize available inventory across multiple retailers and minimize short-ship. Partners are able to select the product allocation preferences that they desire. |
| Inventory | The supply chain management system can provide a single, integrated report to partners regarding product inventory in the various distribution centers to the partners. The reports can include information on inventory adjustments, inventory allocation, and total inventory. |

Referring now still to FIG. 1, the following Table 2 describes the various data exchanges between retailers 130 and the supply chain management system 12 that may be performed by the transaction module 208, or another module of the system 12.

TABLE 2

| | |
|---|---|
| Business Logic | Retailers are able to define business logic, or product selection preferences, to select desired products from partners. The business logic identifies desirable product attributes. Through a matchmaking process, the supply chain management system matches products that meet the product attributes dictated in the business logic. |
| Product Information | The supply chain management system downloads product information regarding the selected products that retailers offer for sale on their respective e-commerce websites. |
| Product Catalog | Supply chain management system generates a product catalog listing all of the products of the Partners that a Retailer is authorized to sell. The products in the catalog may be selected based on retailer inclusion/exclusion preferences defined by partners and product selection criteria defined by retailers. |
| Shipping Order | When a consumer places an order, the retailer will generate a shipping order, which is transmitted to the supply chain management system. The shipping order will identify the purchaser, product, quantity, shipping address and the distribution center selected for shipment, if applicable. The supply chain management system will then forward the shipping order to the identified distribution center or one selected by the system. |
| Inventory | The retailers are provided with inventory information regarding the inventory of products they are authorized to sell by the retailers. |
| Advanced Shipping Notice | The retailers receive notice that products have been shipped by the distribution centers from the supply chain management system to consumers. |

Referring now to FIG. 1, the following Table 3 describes the various data exchanges between distribution centers 140 and the supply chain management system that may be performed by the transaction module 208, or another module of the system 12.

TABLE 3

| | |
|---|---|
| Shipping Order | The distribution centers receive shipping orders from the supply chain management system. The distribution centers ship product to consumers based on the shipping orders. |
| Inventory | The distribution centers provide inventory information to the supply chain management system. The inventory information may include an inventory master list, inventory adjustment information, as well as product location. |
| Shipment Confirmation | The distribution centers provide confirmations that products have been received at the distribution centers from the partners and are available to ship to consumers. |
| Advanced Shipping Notice | Advanced shipment notices are used to notify the supply management system of a shipment to a consumer that purchased a product. |

It will be appreciated that the transactions identified in Tables 1-3 may take place over a network, such as the Internet.

Figure 7:
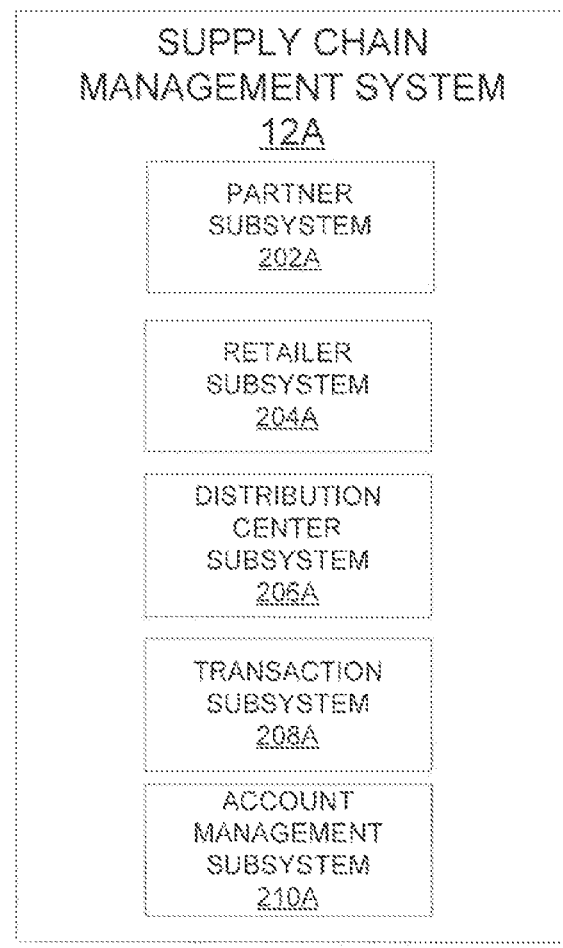
FIG. 7 is a block diagram of a supply chain management system according to an illustrative embodiment of the present disclosure.

Referring now to FIG. 7, there is depicted an illustrative embodiment of a supply chain management system 12A that is also suitable for use in the framework 10 of FIG. 1. The system 12A comprises a partner subsystem 202A, a retailer subsystem 204A, a distribution center subsystem 206A, a transaction subsystem 208A, and an account management subsystem 210A. It will be appreciated that the partner subsystem 202A performs the functions and features similar to the partner module 202 described above. It will be further appreciated that the retailer subsystem 204A performs similar functions and features to the retailer module 204 described above. It will be further appreciated that the distribution center subsystem 206A performs the functions and features to the distribution center module 206 described above. It will be further appreciated that the transaction subsystem 208A performs similar functions and features to the transaction module 208 described above. It will be further appreciated that the account management subsystem 210A performs similar functions and features to the account management module 210 described above.

It will be appreciated that many of the functional units described in this specification have been labeled as "subsystems" to more particularly emphasize their implementation independence. For example, a subsystem may be implemented as a hardware circuit comprising custom VLSI circuits or gate arrays, off-the-shelf semiconductors such as logic chips, transistors, or other discrete components. A subsystem may also be implemented in programmable hardware devices such as field programmable gate arrays, programmable array logic, programmable logic devices, or the like.

Subsystems may also be implemented in software code, sometimes referred to as computer readable instructions, for execution by various types of processors. Where a subsystem includes software code, the subsystem will also include one or more processors and memory. An identified subsystem of executable code may, for instance, comprise one or more physical or logical blocks of computer instructions that may, for instance, be organized as an object, procedure, or function. Nevertheless, the executables of an identified subsystem need not be physically located together, but may comprise disparate instructions stored in different locations which, when joined logically together, comprise the subsystem and achieve the stated purpose for the subsystem.

Indeed, a subsystem of executable code may be a single instruction, or many instructions, and may even be distributed over several different code segments, among different programs, and across several memory devices. Similarly, operational data may be identified and illustrated herein within subsystems, and may be embodied in any suitable form and organized within any suitable type of data structure. The operational data may be collected as a single data set, or may be distributed over different locations including over different storage devices, and may exist, at least partially, merely as electronic signals on a system or network.

Figure 8:
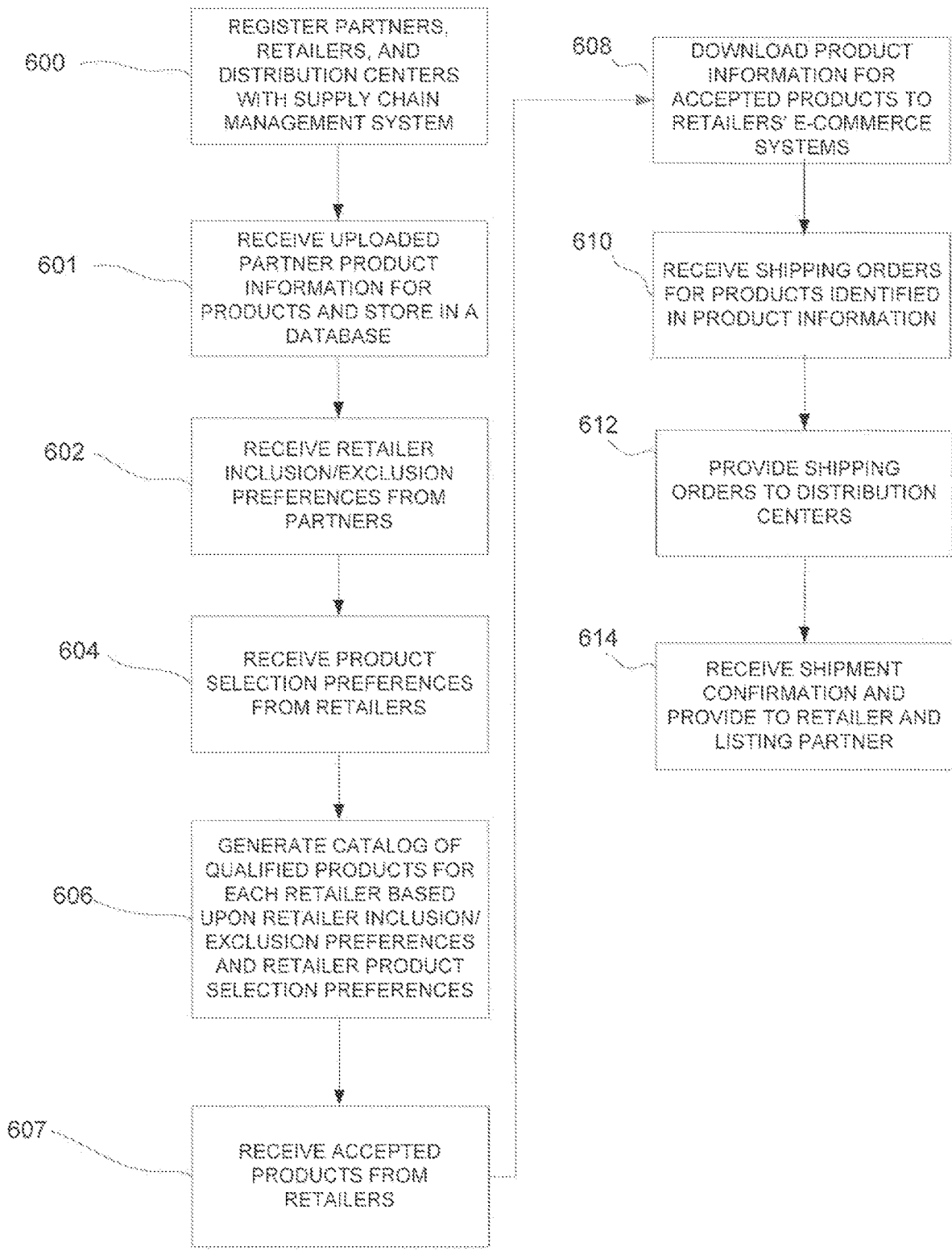
FIG. 8 depicts an exemplary method of managing a supply chain using a supply chain management system according to an illustrative embodiment of the present disclosure.

Referring now to FIG. 8, there is depicted a flow diagram of a process performed by the system 12 according to an embodiment of the present disclosure. At step 600, a plurality of partners, retailers, and distribution centers may be registered with a centralized supply chain management system. The plurality of partners, retailers, and distribution centers may form a community of electronically interconnected users. At step 601, a plurality of the partners may upload product information to the supply chain management system. The product information may relate to products offered for sale by the partners. The product information may include product images, product descriptions, product attributes, and pricing information. The product information may relate to products offered for sale by the partners. The supply chain management system may store the product information in a database in product catalogs.

At step 602, the partners may be provided with a list of retailers registered with the supply chain management system on a display of a computer. The retailers may operate an e-commerce system that conducts e-commerce with consumers. The retailers may allow third-parties to offer goods for sale on their e-commerce systems. In an illustrative embodiment, the retailers' e-commerce system may include a third-party marketplace feature.

The partners may select preferred ones of the retailers from the list using an input device of the computer. In particular, the selected ones of the retailers constitute those retailers with whom the partners desire to do business. The partners may select the retailers based on business objectives. In particular, the partners may select to include or exclude retailers based on the partners' business models.

At step 604, the supply chain management system may receive product selection preferences or business logic from the retailers. In an illustrative embodiment, the product selection preferences are utilized to filter the products stored in the database based on the retailers business objectives. The product selection preferences may define product attributes.

At step 606, the supply chain management system generates a customized catalog of qualified products for each retailer based on the retailer inclusion/exclusion preferences provided by the partners and the product selection preferences provide by the retailer. Each retailer may have its own customized e-marketplace. The qualified products for each retailer may define an e-marketplace.

At step 607, the retailers are provided with a list of qualified products on a computer display to accept or reject qualified products listed in the catalog. That is, the retailers are able to accept or reject the products in their respective customized catalogs.

At step 608, product information for the accepted products in the product catalogs is downloaded from the supply chain management system to the e-commerce systems associated with the retailers. The retailers may then offer the products for sale on the retailers' e-commerce systems to consumers using the product information.

At step 610, the supply chain management system receives shipping orders for products sold on the retailers' e-commerce systems. The shipping orders may identify the product sold, purchaser, quantity, shipping address, and, optionally, the distribution center designated to ship the product.

At step 612, the supply chain management system sends the shipping orders to the distribution centers identified in the shipping orders. In the alternative, the supply chain management system selects a distribution center based on the shipping address. For example, the supply chain management system may select the distribution center closest to the shipping address through an automated process. At step 614, the supply chain management system receives a shipment confirmation from the distribution center and provides it to both the retailer who sold the product and the listing partner who provided the product.

Figure 9:
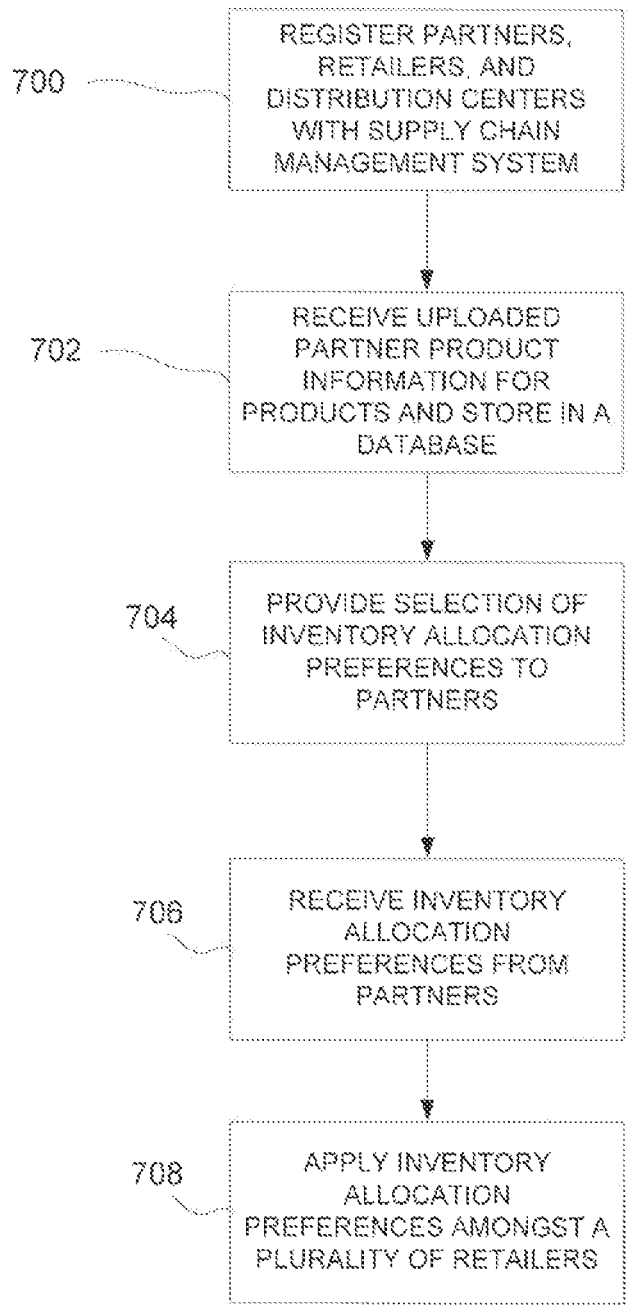
FIG. 9 depicts an exemplary method of managing a supply chain using a supply chain management system according to an illustrative embodiment of the present disclosure.

Referring now to FIG. 9, there is depicted a flow diagram of a process performed by the system 12 according to an illustrative embodiment of the present disclosure. At step 700, a plurality of partners, retailers, and distribution centers may be registered with a centralized supply chain management system. The plurality of partners, retailers, and distribution centers may form a community of electronically interconnected users. At step 702, a plurality of the partners may upload product information to a supply chain management system. The product information may relate to products offered for sale by the partners. The product information may include product images, product descriptions, and pricing information for products. The product information may relate to products offered for sale by the partners. The supply chain management system may store the product information in a database in product catalogs.

At step 704, the centralized management system provides a selection of inventory allocation preferences to partners. The inventory allocation preferences allow partners to specify an inventory allocation method to be used in allocation of products stored in the distribution centers among the retailers. At step 706, the centralized management system receives inventory allocation preferences from the partners. At step 708, the selected inventory allocation preferences are applied amongst a plurality of retailers. This may include providing inventory allocation recommendations to the partners.

In the foregoing Detailed Description, various features of the present disclosure are grouped together in a single illustrative embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed illustrative embodiment. Thus, the following claims are hereby incorporated into this Detailed Description of the Disclosure by this reference, with each claim standing on its own as a separate illustrative embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of managing inventory for e-commerce transactions using a supply chain management system, said method comprising:

registering a plurality of partners, retailers, and distribution centers with a supply chain management system, the supply chain management system having at least one processor coupled to a memory having operating instructions stored therein, the supply chain management system further having a database residing on an electronic storage medium;

inputting in the database product information for products offered by the partners, the product information including product attributes of the products;

receiving retailer inclusion/exclusion preferences from each partner, retailer inclusion/exclusion preferences specifying selected ones of the retailers for each partner;

receiving product selection preferences from each retailer, the product selection preferences specifying product attributes of desirable products;

automatically generating a customized catalog of qualified products for each retailer, using the at least one processor, based on the product selection preferences provided by the retailer and the retailer inclusion/exclusion preferences provided by the partners such that the products in each customized catalog are the products approved by partners by way of the partners' retailer inclusion/exclusion preferences for each retailer;

receiving accepted products from at least one of the retailers based on the catalog;

downloading product information for accepted products to an e-commerce network of the at least one retailer using the supply chain management system;

receiving shipping orders for products sold on the e-commerce network of the at least one retailer, wherein the shipping orders are received and processed by the supply chain management system by utilizing inventory allocation rules defined by each partner;

sending shipping orders to a distribution center corresponding to a partner providing the sold product, using the supply chain management system and following the inventory allocation rules defined by each partner;

receiving a shipment confirmation from the distribution center;

providing the shipment confirmation to both the at least one retailer and the partner who provided the sold product;

providing a partner module that is configured to interface with the supply chain management system to provide a product to a plurality of retailer websites and coordinate inventory of the product over a plurality of distribution centers from the partner module;

providing aggregated inventory information for each of the accepted products for the plurality of distribution centers to the each of the plurality of partners with the partner module; and processing orders from all participating retail marketplaces for each of the accepted products and create a single transaction payload for each of the plurality of distribution centers.

2. The method of claim 1, further comprising registering a plurality of distribution centers with the supply chain management system.

3. The method of claim 2, further comprising generating inventory allocation recommendations for the partners.

4. The method of claim 2, further comprising defining in the database a relationship between products, partners, retailers, and distribution centers.

5. The method of claim 1, further comprising generating transactional information.

6. The method of claim 1, further comprising defining in the database an inventory allocation for one or more retailers based on inventory allocation preferences received from a partner.

7. The method of claim 1, further comprising:
receiving inventory information from a plurality of product distribution centers;
aggregating the inventory information; and
generating an inventory report.

8. The method of claim 1, further comprising:
receiving shipping orders from two or more of the retailers;
aggregating the shipping orders; and
generating a single transaction payload for one or more distribution centers.

9. The method of claim 1, further comprising defining in the database inventory allocation rules selected by each partner as selecting distribution centers for each of the partners based on geographic proximity to consumers of the retailers.

10. The method of claim 1, wherein the inventory allocation rules include: minimize short-ship, maximize inventory, absolute reserve, retailer reserve, and weighted retailer.

11. The method of claim 1, further comprising receiving an upload of product information with relevant product attributes from each partner.

12. The method of claim 1, further comprising sorting products based on product attributes identified by a retailer.

13. The method of claim 1, further comprising downloading product information for the qualified products to a remote computing device for each of the retailers.

14. A system for managing inventory using a supply chain management system, said system comprising:
- at least one processor;
- a memory coupled to the at least one processor;
- operating instructions stored in the memory that, when executed, cause the at least one processor to:
  - (i) register a plurality of partners, retailers, and distribution centers with the system,
  - (ii) maintain in a database product information, the product information including product attributes of products offered by the partners,
  - (iii) receive retailer inclusion/exclusion preferences from each partner,
  - (iv) receive product selection preferences from each retailer, the product selection preferences specifying product attributes of desirable products,
  - (v) automatically generate a customized catalog of qualified products for each retailer based on the product selection preferences of the retailers and the retailer inclusion/exclusion preferences of the partners such that the products in each customized catalog are the products approved by partners by way of the partners' retailer inclusion/exclusion preferences for each retailer,
  - (vi) receive accepted products from at least one of the retailers based on the catalog;
  - (vii) download product information for accepted products to an e-commerce network of the at least one retailer using the supply chain management system,
  - (viii) receive shipping orders for products sold on the e-commerce network of the at least one retailer, wherein the shipping orders are received and processed by the supply chain management system by utilizing inventory allocation rules defined by each partner,
  - (ix) send shipping orders to a distribution center corresponding to a partner providing the sold product, using the supply chain management system and following the inventory allocation rules defined by each partner,
  - (x) receiving a shipment confirmation from the distribution center,
  - (xi) providing the shipment confirmation to both the at least one retailer and the partner who provided the sold product,
  - (xii) provide a partner module that is configured to interface with the supply chain management system to provide a product to a plurality of retailer websites and coordinate inventory of the product over a plurality of distribution centers from the partner module,
  - (xiii) provide an aggregate inventory information for each of the accepted products for the plurality of distribution centers to the each of the plurality of partners with the partner module, and
  - (xiv) process orders from all participating retail marketplaces for each of the accepted products and create a single transaction payload for each of the plurality of distribution centers.

15. The system of claim 14, wherein the operating instructions are further operable, when executed, to cause the at least one processor to: define in the database a relationship between products, partners, retailers, and product distribution centers.

16. The system of claim 14, wherein the operating instructions are further operable, when executed, to cause the at least one processor to: generate inventory allocation recommendations for the partners at the distribution centers.

17. The system of claim 14, wherein the operating instructions are further operable, when executed, to cause the at least one processor to: generate transactional information regarding products offered for sale.

18. The system of claim 14, wherein the operating instructions are further operable, when executed, to cause the at least one processor to: define in the database an inventory allocation for each of the retailers based on product allocation preferences received from the partners.

19. The system of claim 14, wherein the operating instructions are further operable, when executed, to cause the at least one processor to:
- receive inventory information from a plurality of distribution centers;
- aggregate the inventory information; and
- generate an inventory report.

20. The system of claim 14, wherein the operating instructions are further operable, when executed, to cause the at least one processor to:
- process orders from the retailers for products offered for sale in the e-product marketplace;
- aggregate the orders; and
- generate a single transaction payload for each distribution center.

21. The system of claim 14, wherein the operating instructions are further operable, when executed, to cause the at least one processor to: define in the database product allocation preferences selected by each partner as selecting distribution centers for each of the partners based on geographic proximity to consumers of the retailers.

22. The system of claim 14, wherein the product allocation preferences include: minimize short-ship, maximize inventory, absolute reserve, retailer reserve, and weighted retailer.

23. The system of claim 14, wherein the operating instructions are further operable, when executed, to cause the at least one processor to: generate a consolidated product interface.

24. The system of claim 14, wherein the operating instructions are further operable, when executed, to cause the at least one processor to: receive and upload of a product catalog with relevant product attributes, including first cost, from each partner.

25. The system of claim 14, wherein the operating instructions are further operable, when executed, to cause the at least one processor to: select products based on product attributes identified by a retailer.

26. The system of claim 14, wherein the operating instructions are further operable, when executed, to cause the at least one processor to: qualify the products in the e-product marketplace based on product attributes identified by a retailer.

* * * * *